US012313930B2

(12) United States Patent
Zhou et al.

(10) Patent No.: US 12,313,930 B2
(45) Date of Patent: May 27, 2025

(54) DISPLAY DEVICE AND ASSEMBLY METHOD THEREFOR

(71) Applicants: Beijing BOE Display Technology Co., Ltd., Beijing (CN); BOE Technology Group Co., Ltd., Beijing (CN)

(72) Inventors: Qiaoke Zhou, Beijing (CN); Xiang Li, Beijing (CN); Bochang Wang, Beijing (CN); Guojian Qu, Beijing (CN); Tanhong Zhao, Beijing (CN); Gang Li, Beijing (CN); Hui Li, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/291,783

(22) PCT Filed: Jun. 30, 2022

(86) PCT No.: PCT/CN2022/102873
§ 371 (c)(1),
(2) Date: Jan. 24, 2024

(87) PCT Pub. No.: WO2024/000423
PCT Pub. Date: Jan. 4, 2024

(65) Prior Publication Data
US 2025/0093699 A1    Mar. 20, 2025

(51) Int. Cl.
*G02F 1/1335* (2006.01)
*G02F 1/13357* (2006.01)

(52) U.S. Cl.
CPC .. *G02F 1/133512* (2013.01); *G02F 1/133615* (2013.01); *G02F 2202/22* (2013.01); *G02F 2202/28* (2013.01)

(58) Field of Classification Search
CPC .................. G02F 1/133615; G02F 1/133512
See application file for complete search history.

(56) References Cited

U.S. PATENT DOCUMENTS

| | | | |
|---|---|---|---|
| 9,323,100 B1* | 4/2016 | Feng | G02F 1/136204 |
| 2015/0286087 A1* | 10/2015 | Kim | G02B 6/0088 |
| | | | 349/58 |

(Continued)

FOREIGN PATENT DOCUMENTS

| | | |
|---|---|---|
| CN | 201654380 U | 11/2010 |
| CN | 103760706 A | 4/2014 |

(Continued)

OTHER PUBLICATIONS

International Search Report, mailed Mar. 7, 2023, from PCT International Application No. PCT/CN2022/102873, 5 pages.

*Primary Examiner* — Zheng Song
(74) *Attorney, Agent, or Firm* — Workman Nydegger

(57) ABSTRACT

A display device includes a display substrate including a display region and a bezel region surrounding the display region, a portion of bezel region serving as a binding region, the display substrate including a ground terminal; an opposite substrate opposite to the display substrate, the orthographic projection of opposite substrate exposes the binding region; the opposite substrate includes a black matrix, an electrostatic shielding layer; the black matrix includes a first opening of which the orthographic projection is in the bezel region, the first opening separates the black matrix in a first direction intersecting with the direction from the display region to the binding region; a conductive adhesive connecting the ground terminal and the electrostatic shielding layer, the orthographic projection of conductive adhesive is in the bezel region, the conductive adhesive in contact with (Continued)

the side of black matrix facing toward the binding region and perpendicular to the display substrate.

20 Claims, 17 Drawing Sheets

(56) References Cited

U.S. PATENT DOCUMENTS

| | | | | |
|---|---|---|---|---|
| 2015/0346556 | A1* | 12/2015 | Hirota | G02F 1/133345 349/43 |
| 2016/0018707 | A1* | 1/2016 | Kang | G02F 1/133512 257/72 |
| 2016/0377905 | A1* | 12/2016 | Choi | G02F 1/133514 |
| 2016/0378224 | A1 | 12/2016 | Kwon et al. | |
| 2017/0017108 | A1* | 1/2017 | Shin | G02F 1/133615 |
| 2017/0090634 | A1 | 3/2017 | Yang et al. | |
| 2018/0299724 | A1 | 10/2018 | Gu et al. | |
| 2018/0335657 | A1* | 11/2018 | Li | G02F 1/1343 |
| 2020/0133052 | A1* | 4/2020 | Gu | G02F 1/1339 |
| 2020/0387024 | A1* | 12/2020 | Akiyama | G02F 1/1333 |
| 2020/0393727 | A1* | 12/2020 | Kiyota | G02F 1/133788 |
| 2021/0405843 | A1 | 12/2021 | Gong et al. | |

FOREIGN PATENT DOCUMENTS

| | | |
|---|---|---|
| CN | 105182599 A | 12/2015 |
| CN | 105425457 A | 3/2016 |
| CN | 106154632 A | 11/2016 |
| CN | 208225031 U | 12/2018 |
| CN | 211826813 U | 10/2020 |
| CN | 112673336 A | 4/2021 |
| CN | 113110760 A | 7/2021 |
| CN | 214098024 U | 8/2021 |
| CN | 215067621 U | 12/2021 |
| CN | 216133269 U | 3/2022 |
| JP | 2018010026 A | 1/2018 |

* cited by examiner

DISPLAY DEVICE AND ASSEMBLY METHOD THEREFOR

CROSS-REFERENCE TO RELATED APPLICATIONS

This application is a National Stage of International Application No. PCT/CN2022/102873, filed Jun. 30, 2022, which is hereby incorporated by reference in its entirety.

FIELD

The present disclosure relates to the technical field of display, in particular to a display device and an assembly method therefor.

BACKGROUND

In recent years, with industrial upgrading and the development of science and technology, traditional white goods has a rapid transformation trend to smart home appliances, deepening of the concept of 5G and artificial intelligence Internet of Things (AIOT) provides an opportunity for the development of smart home, and intelligent central control is a control core of the smart home, so that it can be predicted that multifunctional development of the intelligent central control will help the rapid development of the smart home, facilitate people's life, improve the quality of life, and enrich everyone's experience.

SUMMARY

Embodiments of the present disclosure provide a display device and an assembly method thereof, and a specific solution is as follows.

In one aspect, an embodiment of the present disclosure provides a display device, including: a display substrate, wherein the display substrate includes a display region and a border region located on a periphery of the display region, at least part of the border region serves as a binding region, and the display substrate includes a grounding terminal located in the binding region; an opposite substrate, arranged opposite to the display substrate, wherein an orthographic projection of the opposite substrate on the display substrate exposes the binding region, the opposite substrate includes a black matrix arranged on a side facing the display substrate and an electrostatic shielding layer arranged on a side facing away from the display substrate, the black matrix includes a first opening, an orthographic projection of the first opening on the display substrate is located in the border region on a side where the binding region is located, the first opening breaks the black matrix in a first direction, and the first direction intersects with a direction pointing to the binding region from the display region; and conducting adhesive, connecting the grounding terminal and the electrostatic shielding layer, wherein an orthographic projection of the conducting adhesive on the display substrate is located in the border region on the side where the binding region is located, and the conducting adhesive makes contact with a side face of the black matrix oriented towards the binding region and perpendicular to the display substrate.

In some embodiments, the display device provided by the embodiment of the present disclosure further includes shading adhesive located on a side of the display substrate away from the opposite substrate and a light bar located on a side of the shading adhesive away from the display substrate, wherein an orthographic projection of the shading adhesive on the display substrate surrounds the display region, and an orthographic projection of the light bar on the display substrate is located in the border region on the side where the binding region is located; and a minimum preset distance between the orthographic projection of the first opening on the display substrate and the orthographic projection of the shading adhesive on the display substrate is a, a manufacturing tolerance of the shading adhesive is $\Delta_1$, an assembly tolerance of the shading adhesive is $\Delta_2$, a manufacturing tolerance of the first opening is $\Delta_3$, an assembly tolerance of the display substrate and the opposite substrate is $\Delta_4$, in a direction perpendicular to the display substrate, a maximum distance between a surface of a side of the shading adhesive facing the display substrate and a surface of a side of the display substrate facing the opposite substrate is b, a critical angle at which an emergent ray of the light bar is fully reflected on the surface of the side of the display substrate facing the opposite substrate is $\theta$, and $(a \pm \sqrt{\Delta_1^2+\Delta_2^2+\Delta_3^2+\Delta_4^2})/b \geq \tan \theta$.

In some embodiments, in the display device provided by the embodiment of the present disclosure, at a certain position away from the conducting adhesive, the first opening includes a first sub-opening, a shape of the first sub-opening is an arc, and a radian of the first sub-opening is greater than or equal to 90° and less than or equal to 94°.

In some embodiments, in the display device provided by the embodiment of the present disclosure, the first opening further includes a second sub-opening and a third sub-opening which extend in the first direction, and the first sub-opening communicates the second sub-opening with the third sub-opening; and in a second direction, a distance between an orthographic projection of the second sub-opening on the display substrate and the display region is greater than a distance between an orthographic projection of the third sub-opening on the display substrate and the display region, and the second direction is the direction pointing to the binding region from the display region.

In some embodiments, in the display device provided by the embodiment of the present disclosure, the black matrix further includes a second opening, and an orthographic projection of the second opening on the display substrate surrounds the display region.

In some embodiments, in the display device provided by the embodiment of the present disclosure, the orthographic projection of the second opening on the display substrate is located in the orthographic projection of the shading adhesive on the display substrate.

In some embodiments, in the display device provided by the embodiment of the present disclosure, an included angle between a shortest line between the orthographic projection of the shading adhesive on the display substrate and the orthographic projection of the third sub-opening on the display substrate and the first direction is $\alpha$, and an included angle between a shortest line between the orthographic projection of the second opening on the display substrate and the orthographic projection of the third sub-opening on the display substrate and the first direction is $\beta$, $\alpha > \beta$.

In some embodiments, in the display device provided by the embodiment of the present disclosure, $\alpha = \arctan(n/m)$, $\beta = \arctan(f/e)$, m is a distance between the orthographic projection of the shading adhesive on the display substrate and the orthographic projection of the third sub-opening on the display substrate in the first direction, n is a distance between the orthographic projection of the shading adhesive on the display substrate and the orthographic projection of the third sub-opening on the display substrate in the second direction, e is a distance between the orthographic projection of the second opening on the display substrate and the orthographic projection of the third sub-opening on the display substrate in the first direction, and f is a distance between the orthographic projection of the second opening on the display substrate and the orthographic projection of the third sub-opening on the display substrate in the second direction.

In some embodiments, in the display device provided by the embodiment of the present disclosure, a width of the first opening is the same as that of the second opening.

A boundary extension line of a side of the second opening away from the display region in the second direction is located on a side of the second sub-opening oriented towards the first sub-opening, and a distance between the boundary extension line of the side of the second opening away from the display region in the second direction and an end face of the first sub-opening adjacent to the second sub-opening is less than or equal to 52 μm.

In some embodiments, the display device provided by the embodiment of the present disclosure further includes a supporting structure located between the shading adhesive and the display substrate, wherein an orthographic projection of the supporting structure on the display substrate is located in the orthographic projection of the shading adhesive on the display substrate.

In some embodiments, the display device provided by the embodiment of the present disclosure further includes an adhesive frame, wherein the adhesive frame includes an adhesive frame body and a plurality of first protrusions, the adhesive frame body defines a containing space, an orthographic projection of the containing space on the display substrate is greater than the display region and partially overlaps the border region, orthographic projections of the plurality of first protrusions on the display substrate are located on the border region on the side where the binding region is located, the plurality of first protrusions extend towards the containing space, and the plurality of first protrusions are arranged side by side in the first direction; and the light bar includes a plurality of light beads sequentially arranged in the first direction, and the light beads are arranged in grooves between the first protrusions.

In some embodiments, in the display device provided by the embodiment of the present disclosure, the plurality of first protrusions include a plurality of first sub-protrusions and a plurality of second sub-protrusions, and the first sub-protrusions and the second sub-protrusions are alternately arranged in the first direction; and sizes of the light beads in the second direction are greater than those of the second sub-protrusions in the second direction and less than those of the first sub-protrusions in the second direction, and the second direction is the direction pointing to the binding region from the display region.

In some embodiments, in the display device provided by the embodiment of the present disclosure, a ratio of the sizes of the first sub-protrusions in the second direction to the sizes of the second sub-protrusions in the second direction is greater than 1 and less than or equal to 2.

In some embodiments, in the display device provided by the embodiment of the present disclosure, a distance between luminous surfaces of the light beads and the display region in the second direction is g, an interval between the first sub-protrusions and the second sub-protrusions in the first direction is h, g/h>0.7, and the second direction is the direction pointing to the binding region from the display region.

In some embodiments, the display device provided by the embodiment of the present disclosure further includes a reflector plate located in the containing space, wherein the reflector plate includes a reflector plate body and a plurality of second protrusions located on a side of the reflector plate body close to the light beads; and the orthographic projections of the light beads on the display substrate are located in the orthographic projections of the second protrusions on the display substrate, and the first protrusions are arranged in grooves between the second protrusions.

In some embodiments, in the display device provided by the embodiment of the present disclosure, there is a gap between a surface of a side of the light beads away from the display substrate and a surface of a side of the reflector plate facing the display substrate.

In some embodiments, in the display device provided by the embodiment of the present disclosure, the reflector plate includes a reflecting surface and a first fool-proofing structure, the reflecting surface is oriented towards the display substrate, and a relative position of the first fool-proofing structure to a center of the reflecting surface is fixed.

In some embodiments, the display device provided by the embodiment of the present disclosure further includes a light guide plate located on the side of the reflector plate facing the display substrate in the containing space, and an orthographic projection of the light guide plate on the display substrate roughly coincides with the orthographic projection of the reflector plate body on the display substrate; and the light beads are located on a side of the light guide plate oriented towards the binding region, and an interval between the luminous surfaces of the light beads and the light guide plate is less than or equal to 0.1 mm.

In some embodiments, in the display device provided by the embodiment of the present disclosure, the light guide plate includes a light emitting surface and a second fool-proofing structure, the light emitting surface is oriented towards the display substrate, and a relative position of the second fool-proofing structure to a center of the light emitting surface is fixed.

In some embodiments, in the display device provided by the embodiment of the present disclosure, the light bar further includes a backlight flexible circuit board, and the backlight flexible circuit board is electrically connected with the plurality of light beads; and the display device further includes a main flexible circuit board, the main flexible circuit board includes a first adsorption region, and the first adsorption region is configured to flatten the main flexible circuit board in a process of binding the main flexible circuit board with the display substrate and the backlight flexible circuit board.

In some embodiments, in the display device provided by the embodiment of the present disclosure, the main flexible circuit board further includes a two-dimensional code, and the two-dimensional code contains material number information and a production date.

In some embodiments, the display device provided by the embodiment of the present disclosure further includes a touch panel located on a side of the opposite substrate away from the display substrate and a touch flexible circuit board electrically connected with the touch panel, the touch flexible circuit board includes a second adsorption region, and the second adsorption region is configured to flatten the touch flexible circuit board in a process of binding the touch flexible circuit board with the touch panel.

In some embodiments, in the display device provided by the embodiment of the present disclosure, the touch flexible circuit board further includes a touch chip and a stiffening plate, the stiffening plate is located on a side of the touch flexible circuit board, a side where the stiffening plate is located is opposite to a side where the touch chip is located, and a region where the stiffening plate is located coincides with a region where the touch chip is located.

In the other aspect, an embodiment of the present disclosure provides an assembly method of a display device, including: fixing a touch panel on a light emitting side of a display panel, wherein the display panel includes a display substrate and an opposite substrate which are oppositely arranged; performing binding connection on a main flexible circuit board and the display substrate, performing binding connection on a touch flexible circuit board and the touch panel, and fixing a light guide module and a light bar, wherein the light guide module includes an adhesive frame, a reflector plate, a light guide plate, a diffuser and a prism; obtaining a center point of the display panel and a center point of the light guide module, and controlling the center point of the display panel to coincide with the center point of the light guide module, so as to achieve alignment of the display panel and the light guide module; performing welding fixing on a backlight flexible circuit board of the light bar and the main flexible circuit board; attaching bonding pad adhesive tape to the main flexible circuit board, wherein the bonding pad adhesive tape at least covers a region where a luminous control bonding pad of the main flexible circuit board is located and a region where a display chip is located; and attaching pull tape to a side of the display panel away from the touch panel.

DETAILED DESCRIPTION OF THE EMBODIMENTS

Figure 1:
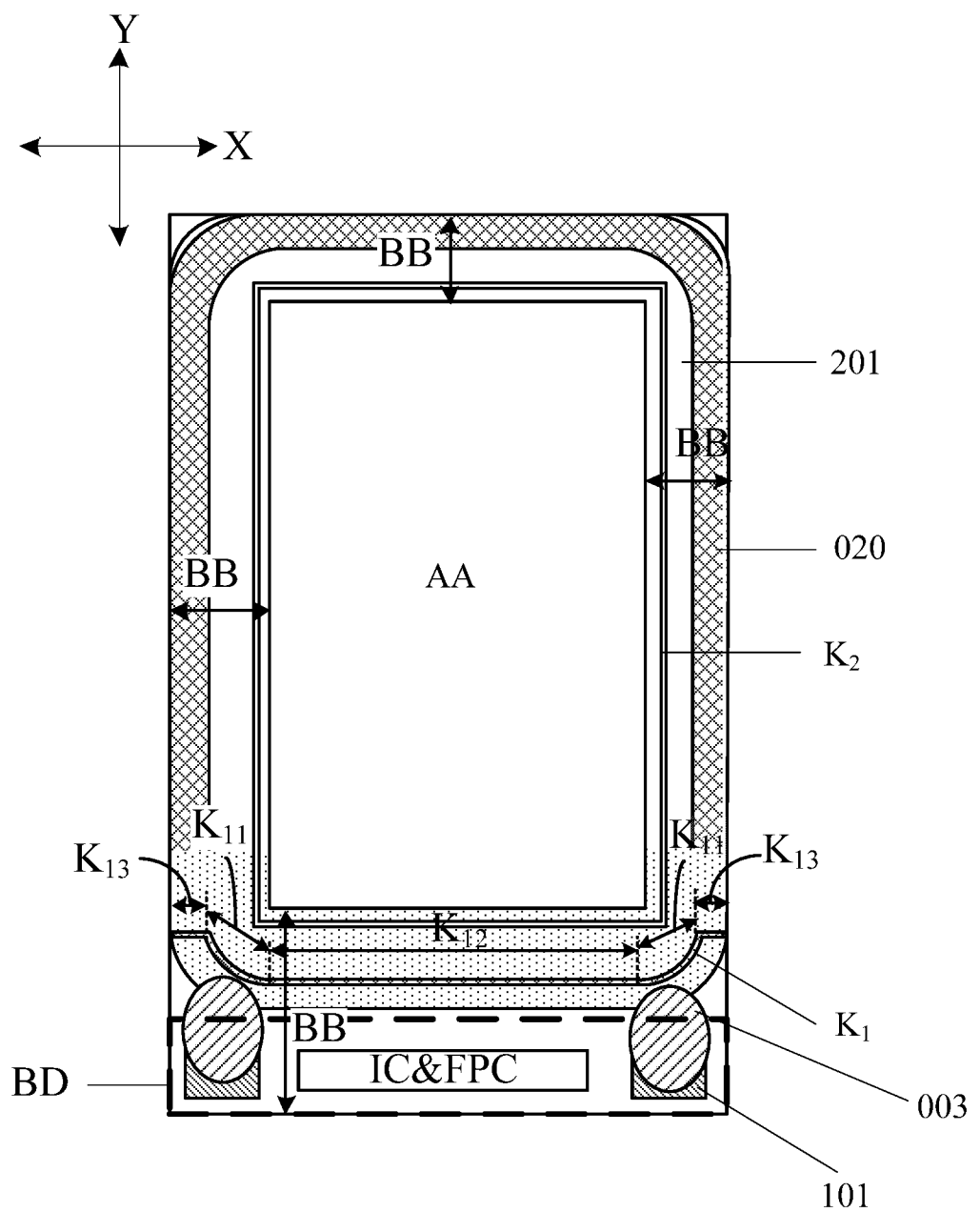
FIG. 1 is a schematic structural diagram of a display device provided by an embodiment of the present disclosure.

To make the objectives, technical solutions and advantages of embodiments of the present disclosure clearer, the technical solutions of the embodiments of the present disclosure will be clearly and fully described below with reference to the accompanying drawings of the embodiments of the present disclosure. It should be noted that the size and shape of each figure in the accompanying drawings do not reflect a true scale, and are only intended to schematically illustrate the content of the present disclosure, and the same or similar reference numerals indicate the same or similar elements or elements having the same or similar functions all the time. In order to keep following illustration of the embodiments of the present disclosure clear and concise, detailed illustration of known functions and known components is omitted in the present disclosure.

Unless otherwise defined, technical or scientific terms used herein shall have the ordinary meanings understood by those ordinarily skilled in the art to which the present disclosure pertains. "First", "second" and similar words used in the specification and claims of the present disclosure do not show any order, quantity or importance, and are merely used to distinguish different components. "Comprise", "include" or similar words indicate that an element or item appearing before such words covers listed elements or items appearing after the words and equivalents thereof, and do not exclude other elements or items. "Inner", "outer", "upper", "lower", etc. are merely used to show a relative position relation. and when an absolute position of a described object is changed, the relative position relation may also be correspondingly changed.

As used in the present disclosure, "about" or "appropriate" includes a stated value and means within a range of acceptable deviations for a specific value as determined by discussed measurement considered by those ordinarily skilled in the art and errors (namely, a limitation of a measurement system) associated with the measurement of a specific quantity. For example, "about" may mean that the difference relative to the stated value is within one or more standard deviation ranges, or within the range of ±30%, 20%, 10% and 5%.

A display device in the related art includes a display substrate and an opposite substrate oppositely arranged, generally, an electrostatic shielding layer is manufactured on a side of the opposite substrate away from the display substrate, and is electrically connected with a grounding terminal of the display substrate through silver colloid, and static electricity introduced into the electrostatic shielding layer by cutting tools, human body and other external live bodies is released to the ground terminal through the silver colloid, so as to achieve the purpose of shielding an external electric field.

In order to avoid light leaking from a periphery of a display region, a black matrix in the opposite substrate extends to a border region covering the periphery of the display region from the display region in the related art, however, this solution will cause contact between the black matrix and the silver colloid, resulting in the black matrix being charged, and after the black matrix is charged, liquid crystals in the display device will deflect to cause an adverse effect, which generates abnormal display and affects display quality.

Figure 2:
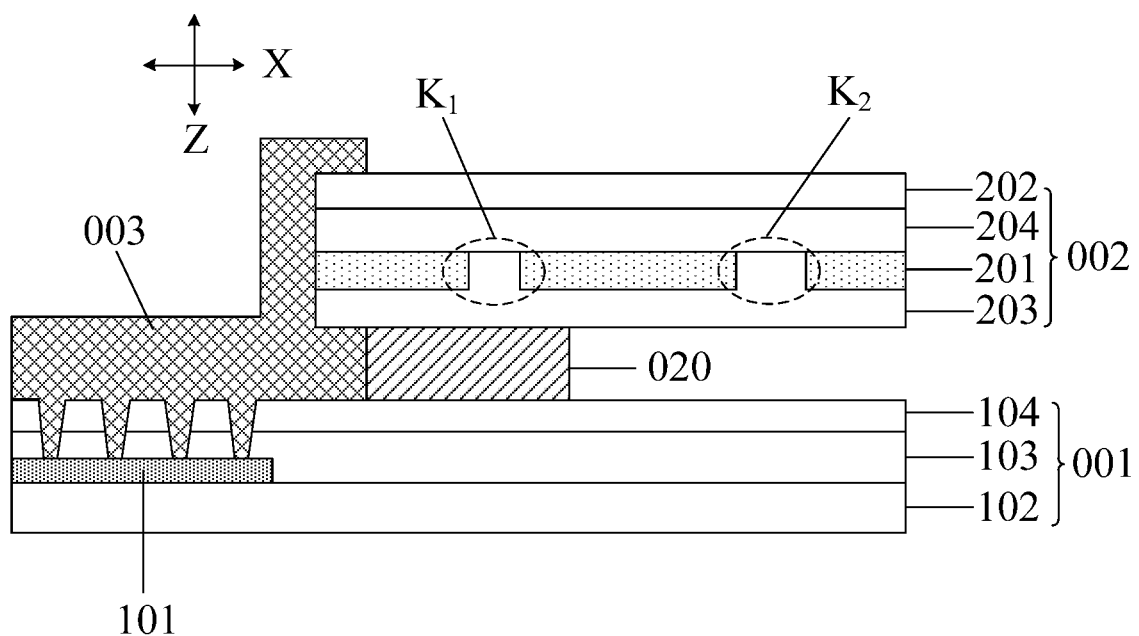
FIG. 2 is a cross-section diagram along a line I-I' in FIG. 1.

In order to solve the above technical problems in the related art, an embodiment of the present disclosure provides a display device, as shown in FIG. 1 and FIG. 2, including:

a display substrate 001, wherein the display substrate 001 includes a display region AA and a border region BB located on a periphery of the display region AA, at least part of the border region BB serves as a binding region BD, and the display substrate 001 includes a grounding terminal 101 located in the binding region BB;

an opposite substrate 002, arranged opposite to the display substrate 001, wherein an orthographic projection of the opposite substrate 002 on the display substrate 001 exposes the binding region BD, the opposite substrate 002 includes a black matrix 201 arranged on a side facing the display substrate 001 and an electrostatic shielding layer 202 arranged on a side facing away from the display substrate 001, the black matrix 201 includes a first opening $K_1$, an orthographic projection of the first opening $K_1$ on the display substrate 001 is in the border region BB on a side where the binding region BD is, the first opening $K_1$ breaks the black matrix 201 in a first direction X, the first direction X intersects with a direction (namely, a second direction Y shown in) pointing to the binding region BD from the display region AA, optionally, a width of the first opening $K_1$ may be 20 μm, optionally, the black matrix 201 is of a mesh structure in the display region AA, and a red color resistance R, a green color resistance G, a blue color resistance B, etc. may be arranged on all meshes; and conducting adhesive 003, connecting the grounding terminal 101 and the electrostatic shielding layer 202, wherein an orthographic projection of the conducting adhesive 003 on the display substrate 001 is on a side where the binding region BD is, of the border region BB, the conducting adhesive 003 makes contact with a side face of the black matrix 201 oriented towards the binding region BD and perpendicular to the display substrate 001, and optionally, the conducting adhesive 003 includes silver (Ag) and other conducting particles.

In the display device provided by embodiments of the present disclosure, the conducting adhesive 003 and the first opening $K_1$ are both located in the border region BB on the side where the binding region BD is located, since the first opening $K_1$ breaks the black matrix 201 in the first direction X intersecting with the direction (namely, the second direction Y shown in the figure) pointing to the binding region BD from the display region AA, static electricity on the conducting adhesive 003 may only be transmitted to the black matrix 201 on a side of the first opening $K_1$ away from the display region AA, and cannot be transmitted to the black matrix 201 on a side of the first opening $K_1$ close to the display region AA, and therefore the static electricity on the conducting adhesive 003 is prevented from being transmitted to the display region AA to affect display, so that the present disclosure may effectively improve display quality.

In some embodiments, as shown in FIG. 3 to FIG. 7, further includes shading adhesive 004 located on a side of the display substrate 001 away from the opposite substrate 002 and a light bar 005 located on a side of the shading adhesive 004 away from the display substrate 001, wherein an orthographic projection of the shading adhesive 004 on the display substrate 001 surrounds the display region AA, and an orthographic projection of the light bar 005 on the display substrate 001 is in a side where the binding region BD is, of the border region BB; a minimum preset distance between the orthographic projection of the first opening $K_1$ on the display substrate 001 and the orthographic projection of the shading adhesive 004 on the display substrate 001 is a, a manufacturing tolerance of the shading adhesive 004 is $\Delta 1$, an assembly tolerance of the shading adhesive 004 is $\Delta 2$, a manufacturing tolerance of the first opening $K_1$ is $\Delta 3$, an assembly tolerance of the display substrate 001 and the opposite substrate 002 is $\Delta 4$, in a direction Z perpendicular to the display substrate 001, a maximum distance between a surface of a side of the shading adhesive 004 facing the display substrate 001 and a surface of a side of the display substrate 001 facing the opposite substrate 002 is b, a critical angle at which an emergent ray of the light bar 005 is fully reflected on the surface of the side of the display substrate 001 facing the opposite substrate 002 is θ, $(a\pm\sqrt{\Delta_1^2+\Delta_2^2+\Delta_3^2+\Delta_4^2})/b \geq \tan\theta$, the emergent ray of the light bar 005 is fully reflected on the surface of the side of the display substrate 001 facing the opposite substrate 002 so that the emergent ray cannot be irradiated to the first opening $K_1$, and a bright line formed by light leaking the first opening $K_1$ is effectively avoided.

In some embodiments, the critical angle θ at which the emergent ray of the light bar 005 is fully reflected on the surface of the side of the display substrate 001 facing the opposite substrate 002 is equal to arc sin $(n_1/n_2)$, $n_1$ is a refractive index of a film layer of the display substrate 001 closest to the opposite substrate 002, $n_2$ is an air refractive index, for example, the critical angle θ is 42°, a minimum actual distance a' (equivalent to $a\pm\sqrt{\Delta_1^2+\Delta_2^2+\Delta_3^2+\Delta_4^2}$) between the orthographic projection of the first opening $K_1$ on the display substrate 001 and the orthographic projection of the shading adhesive 004 on the display substrate 001 is about 0.48 mm, in the direction Z perpendicular to the display substrate 001, a maximum distance b between the surface of the side of the shading adhesive 004 facing the display substrate 001 and the surface of the side of the display substrate 001 facing the opposite substrate 002 is 0.51 mm, and a reflection angle of the emergent ray of the light bar 005 on the surface of the side of the display substrate 001 facing the opposite substrate 002 is arctan (a'/b), namely 44°. It is thus clear that the reflection angle 44° of the emergent ray of the light bar 005 on the surface of the side of the display substrate 001 facing the opposite substrate 002 is greater than the fully-reflected critical angle 42°, and therefore, all the emergent ray of the light bar 005 is fully reflected on the surface of the side of the display substrate 001 facing the opposite substrate 002, to avoid light leaking on the first opening $K_1$.

Figure 3:
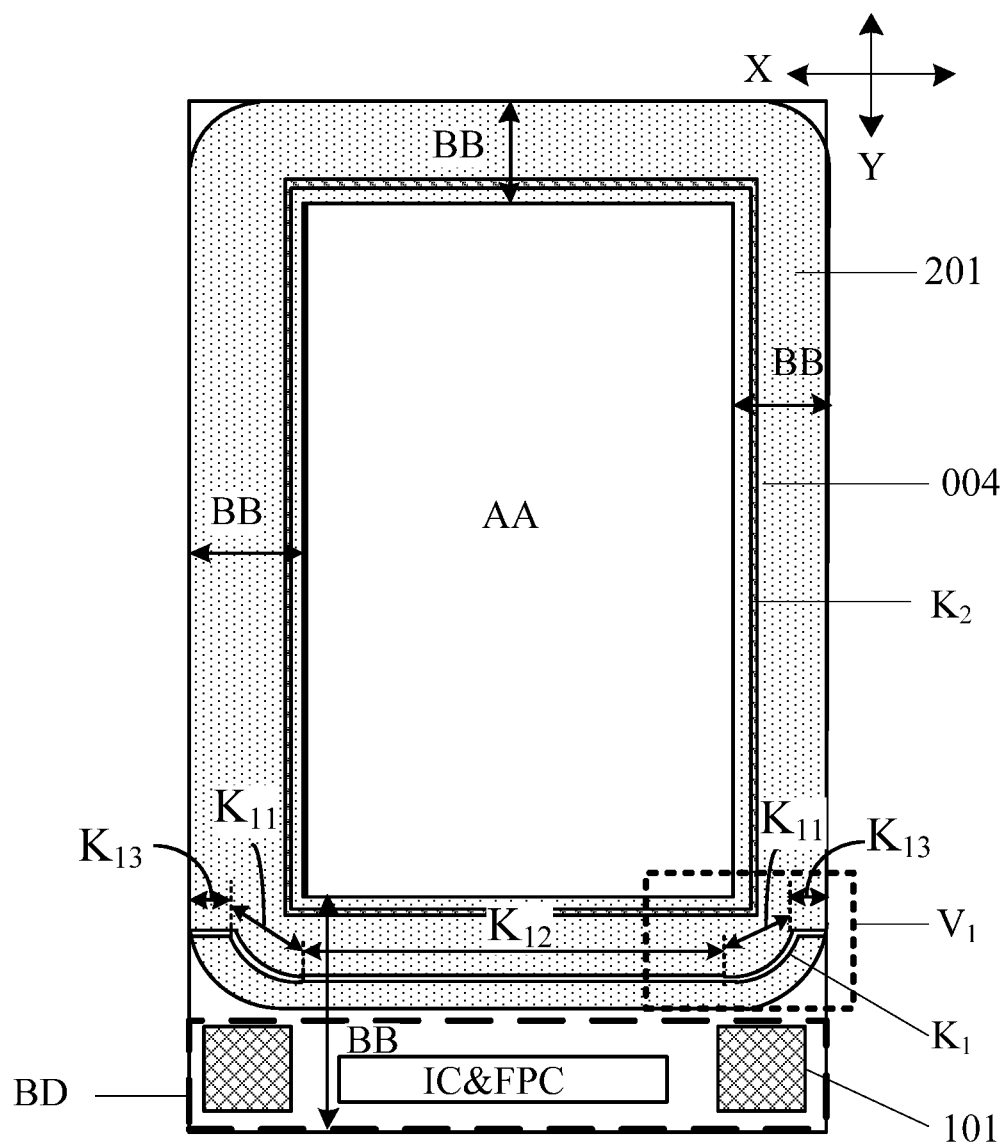
FIG. 3 is another schematic structural diagram of a display device provided by an embodiment of the present disclosure.
Figure 4:
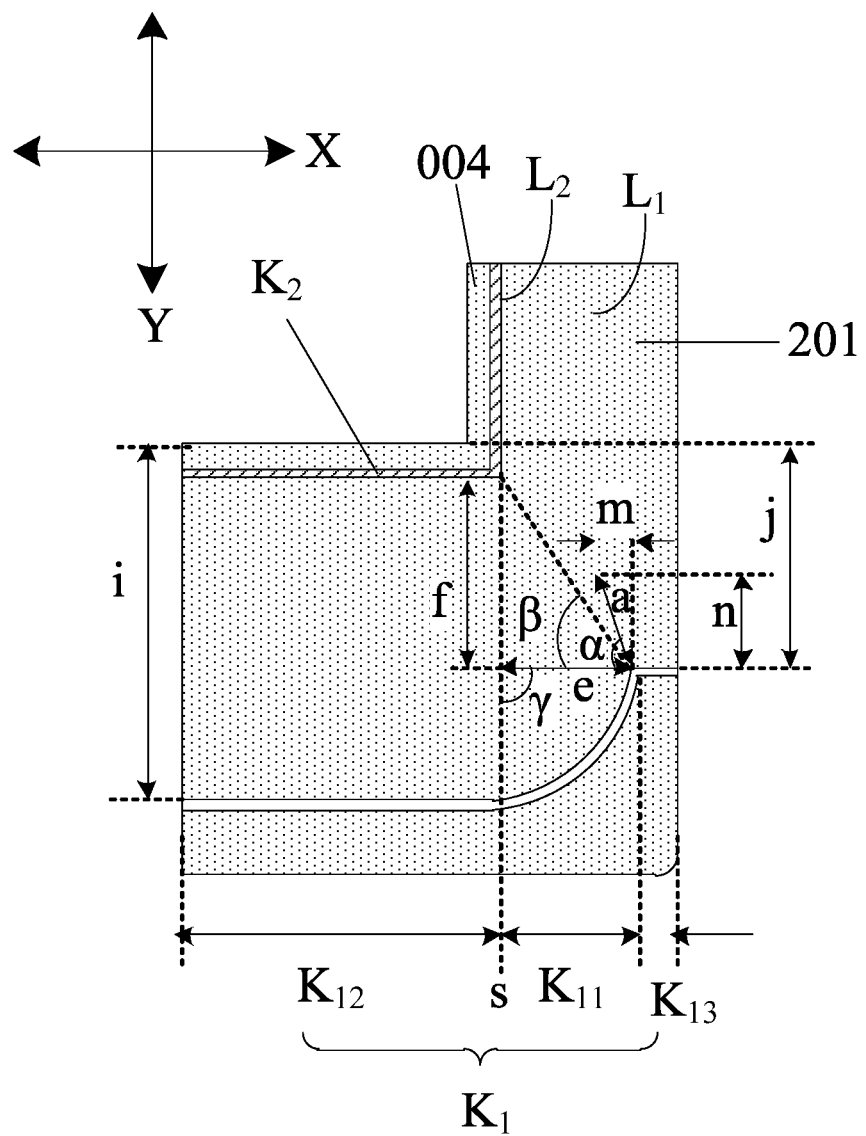
FIG. 4 is an enlarged schematic structural diagram of a region $V_1$ shown in FIG. 3.

In some embodiments, as shown in FIG. 1, FIG. 3 and FIG. 4, at a certain position away from the conducting adhesive 003, the first opening $K_1$ includes a first sub-opening $K_{11}$, and a shape of the first sub-opening $K_{11}$ is an arc. The arc first sub-opening $K_{11}$ may block static electricity transmission paths in all radius directions of the arc at the same time, so that an adverse effect of the static electricity on a picture of the display region AA may be better avoided. Optionally, a radian γ of the first sub-opening $K_{11}$ is greater than or equal to 90° and less than or equal to 94°, such as 90°, 91°, 92°, 93° and 94°, so that the first sub-opening $K_{11}$ blocks the static electricity transmission paths all around in all directions from the first direction X gradually transiting to the second direction Y, and the adverse effect of the static electricity on the picture of the display region AA is avoided to the maximum.

In some embodiments, to improve the blocking effect on the static electricity, as shown in FIG. 1, FIG. 3 and FIG. 4, the first opening $K_1$ further includes a second sub-opening $K_{12}$ and a third sub-opening $K_{13}$ which extend in the first direction X, and the first sub-opening $K_{11}$ communicates the second sub-opening $K_{12}$ with the third sub-opening $K_{13}$; and in the second direction Y, a distance i between an orthographic projection of the second sub-opening $K_{12}$ on the display substrate 001 and the display region AA is greater than a distance j between an orthographic projection of the third sub-opening $K_{13}$ on the display substrate 001 and the display region AA, and the second direction Y is the direction pointing to the binding region BD from the display region AA. Optionally, widths of the first sub-opening $K_{11}$, the second sub-opening $K_{12}$ and the third sub-opening $K_{13}$ are the same, that is, they may be completely the same, or within an error range caused factors such as manufacturing and measuring. Exemplarily, the widths of the first sub-opening $K_{11}$, the second sub-opening $K_{12}$ and the third sub-opening $K_{13}$ are all 20 μm.

In some embodiments, as shown in Fig. 1 to FIG. 4, the black matrix 201 may further include a second opening $K_2$, an orthographic projection of the second opening $K_2$ on the display substrate 001 surrounds the display region AA, and the second opening $K_2$ may block the static electricity transmission paths on the periphery of the display region AA, so as to further avoid the adverse effect of the static electricity on the picture of the display region AA. Optionally, a width of the second opening $K_2$ is the same as that of the first opening $K_1$, which, for example, is 20 μm.

In some embodiments, as shown in FIG. 3, the orthographic projection of the second opening $K_2$ on the display substrate 001 is located in the orthographic projection of the shading adhesive 004 on the display substrate 001, thus, the emergent ray of the light bar 005 will be blocked by the shading adhesive 004, and cannot be irradiated to the second opening $K_2$, and therefore light leaking on the second opening $K_2$ is avoided.

In some embodiments, as shown in FIG. 4, an included angle between a shortest line between the orthographic projection of the shading adhesive 004 on the display substrate 001 and the orthographic projection of the third sub-opening $K_{13}$ on the display substrate 001 and the first direction X is α, and an included angle between a shortest line between the orthographic projection of the second opening $K_2$ on the display substrate 001 and the orthographic projection of the third sub-opening $K_{13}$ on the display substrate 001 and the first direction X is β, α>β, thus, it may be ensured that a boundary $L_1$ of a side of the shading adhesive 004 away from the display region AA is located on a periphery of a boundary $L_2$ of a side of the second opening $K_2$ away from the display region AA, that is, it may be ensured that the orthographic projection of the second opening $K_2$ on the display substrate 001 is located in the orthographic projection of the shading adhesive 004 on the display substrate 001, thus, the emergent ray of the light bar 005 will be blocked by the shading adhesive 004, and cannot be irradiated to the second opening $K_2$, and therefore light leaking on the second opening $K_2$ is avoided.

In some embodiments, as shown in FIG. 4, α=arctan (n/m), β=arctan (f/e), m is a distance between the orthographic projection of the shading adhesive 004 on the display substrate 001 and the orthographic projection of the third sub-opening $K_{13}$ on the display substrate 001 in the first direction X, n is a distance between the orthographic projection of the shading adhesive 004 on the display substrate 001 and the orthographic projection of the third sub-opening $K_{13}$ on the display substrate 001 in the second direction Y, e is a distance between the orthographic projection of the second opening $K_2$ on the display substrate 001 and the orthographic projection of the third sub-opening $K_{13}$ on the display substrate 001 in the first direction X, and f is a distance between the orthographic projection of the second opening $K_2$ on the display substrate 001 and the orthographic projection of the third sub-opening $K_{13}$ on the display substrate 001 in the second direction Y.

In some embodiments, as shown in FIG. 4, a boundary $K_2$ extension line of a side of the second opening $K_2$ away from the display region AA in the second direction Y is located on a side of the second sub-opening $K_{12}$ oriented towards the first sub-opening $K_{11}$, and a distance between the boundary $K_2$ extension line of the side of the second opening $K_2$ away from the display region AA in the second direction Y and an end faces of the first sub-opening $K_{11}$ adjacent to the second sub-opening $K_{12}$ is less than or equal to 52 μm. Specifically, FIG. 4 shows that the distance between the boundary $K_2$ extension line of the side of the second opening $K_2$ away from the display region AA in the second direction Y and the end face s of the first sub-opening $K_{11}$ adjacent to the second sub-opening $K_{12}$ is 0. In some embodiments, the distance between the boundary $K_2$ extension line of the side of the second opening $K_2$ away from the display region AA in the second direction Y and the end face s of the first sub-opening $K_{11}$ adjacent to the second sub-opening $K_{12}$ may be 10 μm, 20 μm, 30 μm, 40 μm or 50 μm, etc., and in this case, it is equivalent to intersecting arrangement of the boundary $K_2$ extension line of the side of the second opening $K_2$ away from the display region AA in the second direction Y and the first sub-opening $K_{11}$.

Figure 5:
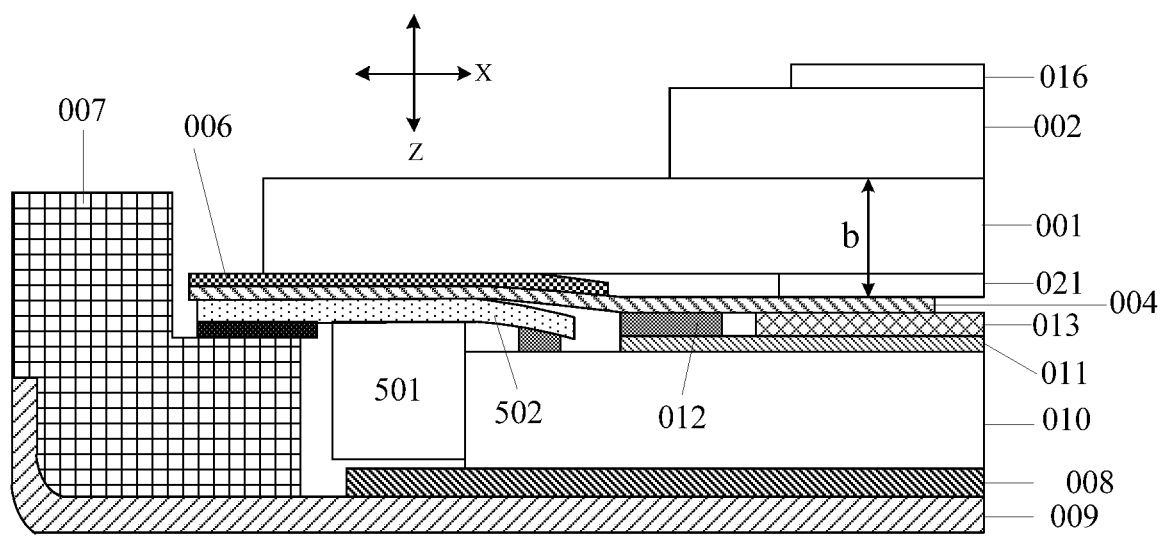
FIG. 5 is a cross-section schematic structural diagram of a display device provided by an embodiment of the present disclosure in a border region.
Figure 6:
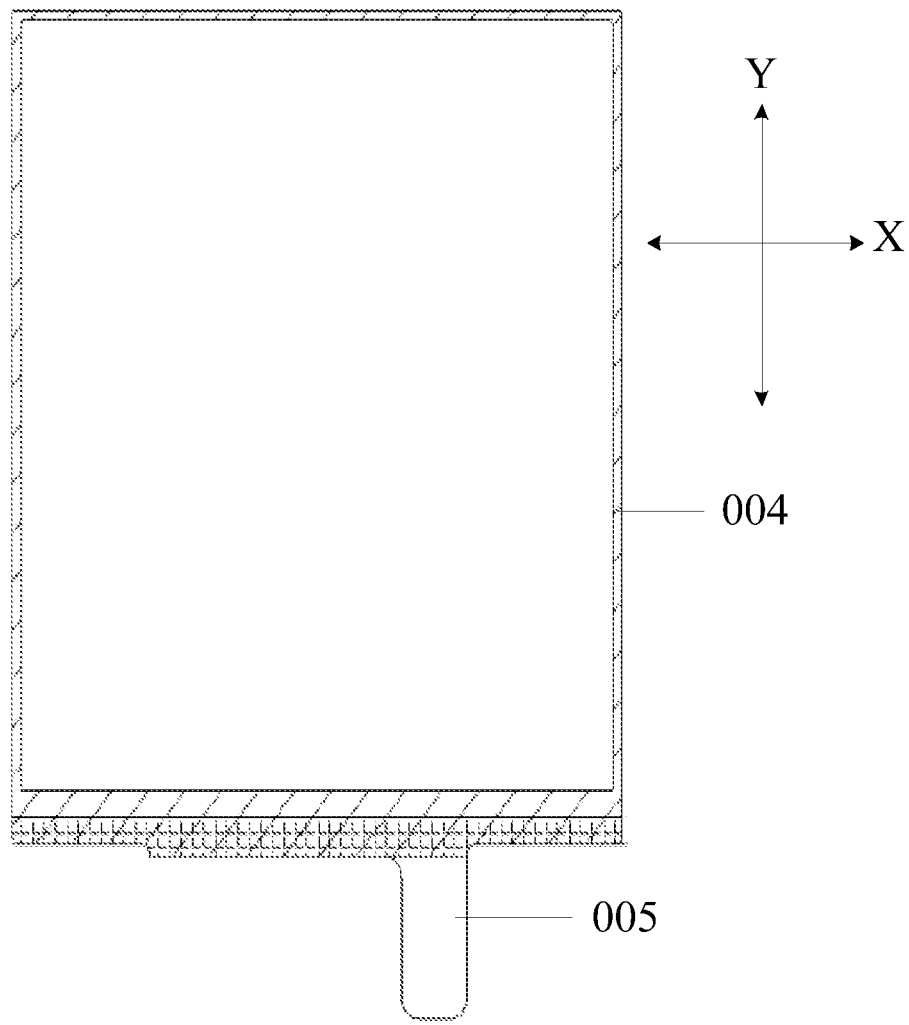
FIG. 6 is a schematic structural diagram of shading adhesive and a light bar provided by an embodiment of the present disclosure.

In some embodiments, as shown in FIG. 5, further includes a supporting structure 006 located between the shading adhesive 004 and the display substrate 001, wherein an orthographic projection of the supporting structure 006 on the display substrate 001 is located in the orthographic projection of the shading adhesive 004 on the display substrate 001. Existence of the supporting structure 006 avoids direct contact between the shading adhesive 004 and the display substrate 001, so that deformation of the display substrate 001 caused by deformation of the shading adhesive 004 may be effectively prevented, which solves a light leaking problem caused by the deformation of the display substrate 001. Optionally, a material of the supporting structure 006 may be resin materials such as polyethylene glycol terephthalate (PET) and polyimide (PI).

Figure 8:
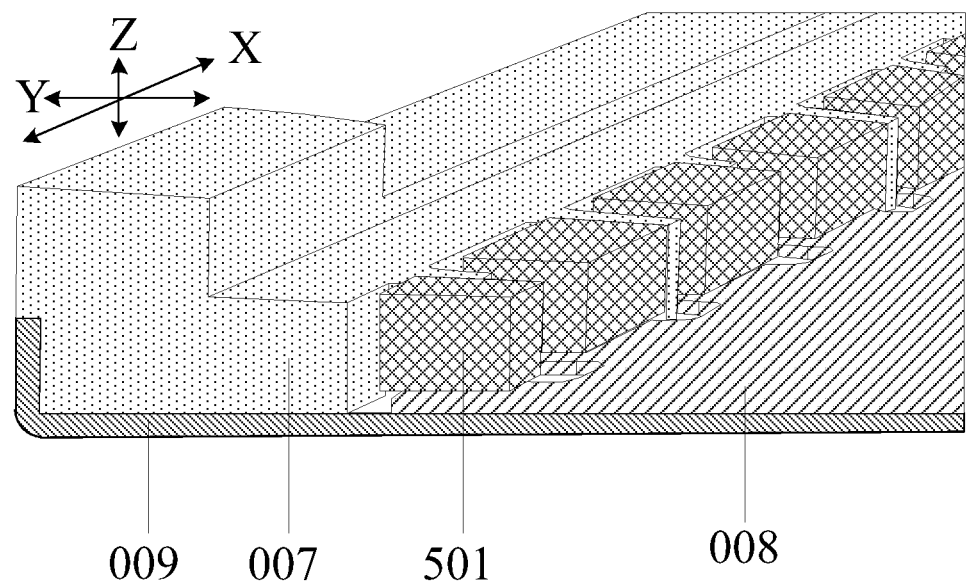
FIG. 8 is a schematic structural diagram of an adhesive frame, light beads, a reflector plate and a back plate provided by an embodiment of the present disclosure.
Figure 9:
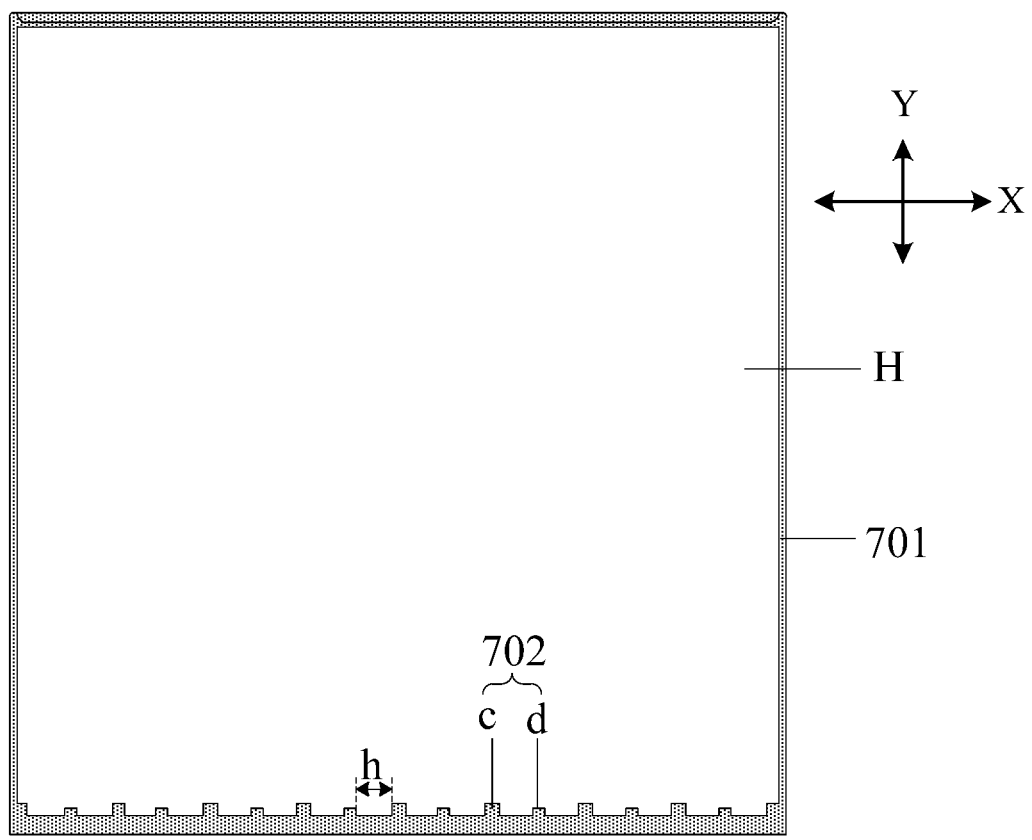
FIG. 9 is a schematic structural diagram of an adhesive frame provided by an embodiment of the present disclosure.
Figure 10:
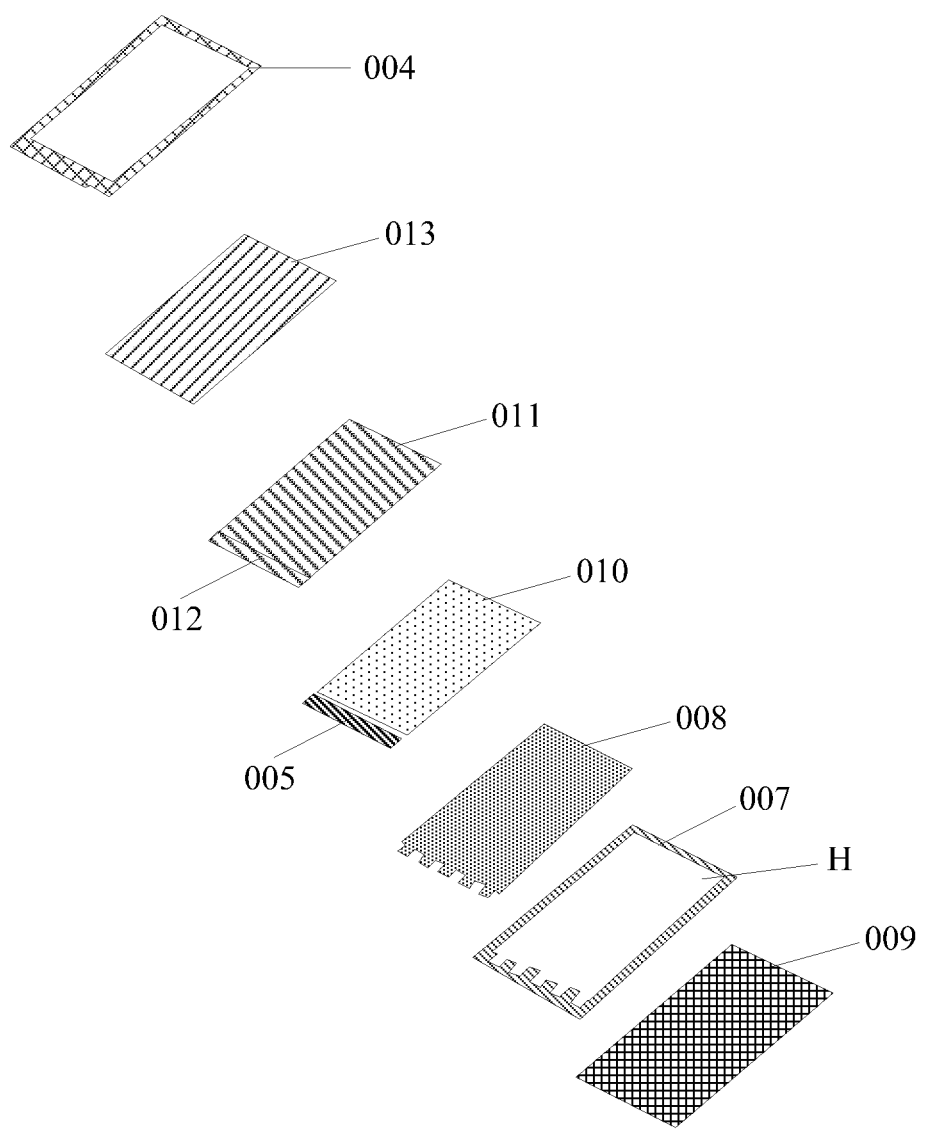
FIG. 10 is a schematic structural diagram of a light guide module provided by an embodiment of the present disclosure.

In some embodiments, as shown in FIG. 8 to FIG. 10, may further include an adhesive frame 007, wherein the adhesive frame 007 includes an adhesive frame body 701 and a plurality of first protrusions 702, the adhesive frame body 701 defines a containing space H, an orthographic projection of the containing space H on the display substrate 001 is greater than the display region AA and partially overlaps the border region BB, orthographic projections of the plurality of first protrusions 702 on the display substrate are located in the border region BB on the side where the binding region BD is located, the plurality of first protrusions 702 extend towards the containing space H, and the plurality of first protrusions 702 are arranged side by side along the first direction X; and the light bar 005 includes a plurality of light beads 501 sequentially arranged in the first direction X, and the light beads 501 are arranged in grooves between the first protrusions 702, so as to be limited through the first protrusions 702 and facilitate heat dissipation of the light beads 501, which avoids an influence on experience of a client due to damage to the light beads 501 by too high temperature. Optionally, the adhesive frame body 701 and the plurality of first protrusions 702 are of an integrated structure.

In some embodiments, as shown in FIG. 8 and FIG. 9, to facilitate arrangement of the light beads 501 in the grooves between the plurality of first protrusions 702, the plurality of first protrusions 702 may be set to include a plurality of first sub-protrusions c and a plurality of second sub-protrusions d, and the first sub-protrusions c and the second sub-protrusions d are alternately arranged in the first direction X; and sizes of the light beads 501 in the second direction Y are greater than those of the second sub-protrusions d in the second direction Y and less than those of the first sub-protrusions c in the second direction Y, and the second direction Y is the direction pointing to the binding region BD from the display region AA.

Optionally, the display device provided by the present disclosure may be applied to a touch field, such as a mobile phone/a small display screen. However, when the display device is as touch, hands will make direct contact with the display device, and sometimes, the display device has a high temperature, which brings a poor feeling of hot to an experiencer. Through shape design of the first sub-protrusions c and the second sub-protrusions d, on one hand, part of space will be reserved between the sub-protrusions and the light beads 501 to be beneficial to heat dissipation, and on the other hand, a binding area of light strip adhesive tape (such as black and white adhesive 503) and the adhesive frame 007 may be enlarged, which is beneficial to stability of apparatus assembly. Comprehensively considering the above factors, a ratio of the sizes of the first sub-protrusions c in the second direction Y to the sizes of the second sub-protrusions d in the second direction Y is set to be greater than 1 and less than or equal to 2. Exemplarily, the sizes of the light beads 501 in the second direction Y are 0.85 mm, the sizes of the first sub-protrusions c in the second direction Y are 0.95 mm, the sizes of the second sub-protrusions d in the second direction Y are 0.5 mm, and a ratio of the sizes of the first sub-protrusions c in the second direction Y to the sizes of the second sub-protrusions d in the second direction Y is 1.9.

In some embodiments, to be beneficial to heat dissipation of the light beads 501, the light beads 501 need to keep a certain distance from the first protrusions 702 in the first direction X, for example, the sizes of the light beads 501 in the first direction X are 3 mm, a size of the groove between every two adjacent first protrusions 702 (namely, the first sub-protrusion c and the second sub-protrusion d which are adjacent) in the first direction X is 3.6 mm, and equivalently, the light beads 501 keep 0.3 mm away from the first protrusions 702 on two sides in the first direction X respectively. Optionally, a distance between luminous surfaces of the light beads 501 and the display region AA in the second direction Y is g, an interval between the first sub-protrusions c and the second sub-protrusions d in the first direction X is h (as shown in FIG. 9), and to enable the emergent ray of the light beads 501 to be irradiated to the display region AA as much as possible, g/h>0.7 may be set, such as 0.8, 0.9 and 1.

Figure 7:
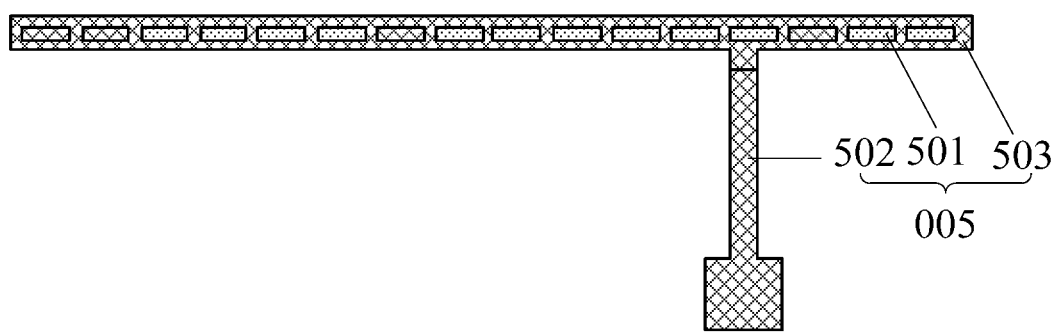
FIG. 7 is a schematic structural diagram of a light bar provided by an embodiment of the present disclosure.

In some embodiments, as shown in FIG. 5 and FIG. 7, the light bar 005 may further include a backlight flexible circuit board 502, the backlight flexible circuit board 502 is electrically connected with the plurality of light beads 501, and the backlight flexible circuit board 502 is in lap joint with a surface of a side of the adhesive frame 007 oriented towards the display substrate 001. Optionally, the backlight flexible circuit board 502 is spliced to all the first protrusions 702 and part of the adhesive frame body 701 close to the first protrusions 702 through the black-and-white adhesive 503 so as to increase the splicing area of the backlight flexible circuit board 502 and the adhesive frame 007, and the influence of shaking of the light beads 501 in a trust experiment on the optical effect of a product is avoided.

Figure 11:
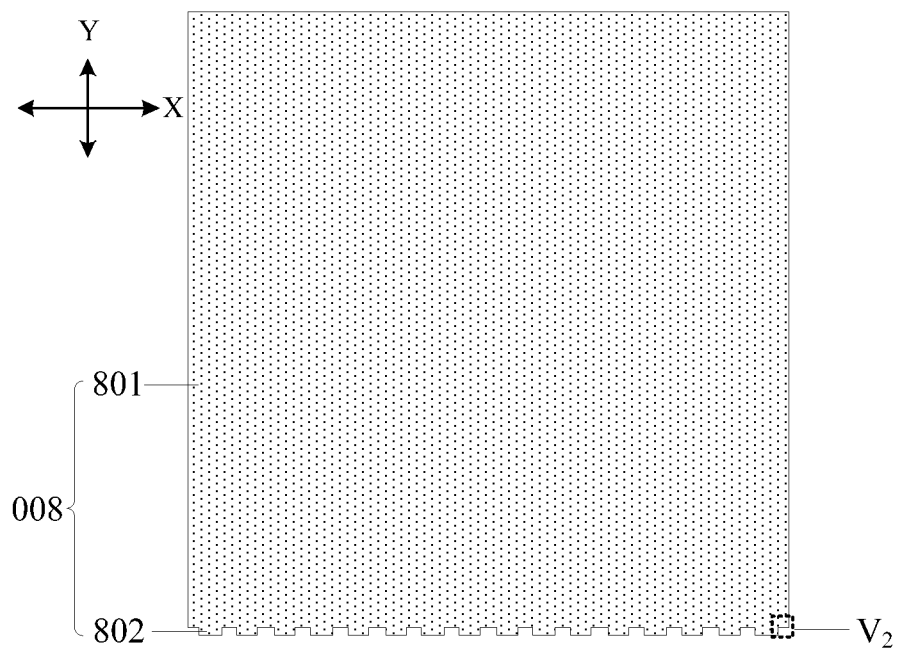
FIG. 11 is a schematic structural diagram of a reflector plate provided by an embodiment of the present disclosure.

In some embodiments, as shown in FIG. 8, FIG. 10 and FIG. 11, further includes a reflector plate 008 located in the containing space H, the reflector plate 008 includes a reflector plate body 801 and a plurality of second protrusions 802 located on a side of the reflector plate body 801 close to the light beads 501; and the orthographic projections of the light beads 501 on the display substrate 001 are located in orthographic projections of the second protrusions 802 on the display substrate 001, the first protrusions 702 and the second protrusions 802 are mutually staggered, that is, each first protrusion 702 is arranged at a position between every two adjacent second protrusions 802, or, each second protrusion 802 is arranged at a position between every two adjacent first protrusions 702. Therefore, not only can it achieve positioning assembly of the light beads 501 through matching of the first protrusions 701 and the second protrusions 802, but also the emergent ray of the light beads 501 may be reflected through the second protrusions 802 so as to effectively enhance a light effect. Optionally, the reflector plate body 801 and the plurality of second protrusions 802 are of an integrated structure.

Optionally, sizes of the second protrusions 802 in the first direction X may be equal to the sizes of the light beads 501 in the first direction X, for example, the second protrusions and the light beads are both 3 mm, so as to facilitate the second protrusions 802 matched with the sizes (such as 3.6 mm) of the grooves between the first protrusions 501 in the first direction X. Optionally, the sizes of the grooves between the adjacent second protrusions 802 in the second direction Y are greater than the sizes of the first protrusions 702 in the second direction Y, so as to be beneficial to arrangement of the first protrusions 702 in the grooves between the second protrusions 802, for example, the sizes of the grooves between the adjacent second protrusions 802 in the second direction Y are greater than the sizes of the first sub-protrusions c in the second direction Y by 0.2 mm.

In some embodiments, there is a gap between a surface of a side of the light beads 501 away from the display substrate 001 and a surface of a side of the reflector plate 008 facing the display substrate 001, for example, there is a gap of 0.5 mm between them, so as to be beneficial to heat dissipation of the light beads 501, and the light beads 501 may be prevented from making contact with the reflector plate 008 to scald the reflector plate 008.

Figure 12:
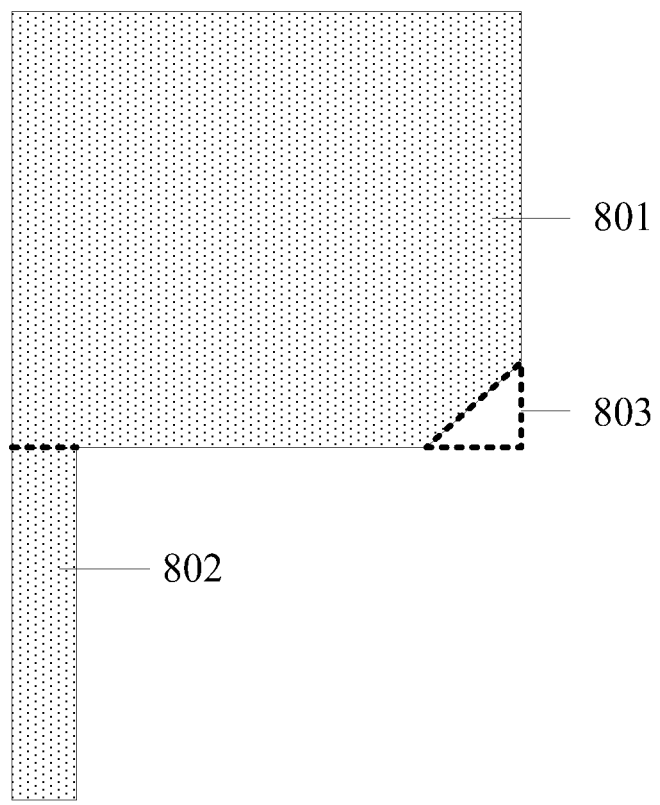
FIG. 12 is an enlarged schematic structural diagram of a region $V_2$ in FIG. 11.

In some embodiments, the reflector plate 008 further includes a reflecting surface, for ensuring that the reflecting surface can reflect the emergent ray of the light beads 501, it needs to ensure that the reflecting surface of the reflector plate 008 is oriented towards the display substrate 001, to facilitate distinguishing of the reflecting surface in an arrangement process, as shown in FIG. 11 and FIG. 12, a first fool-proofing structure 803 may be arranged on the reflector plate 008, and fixing of a relative position of the first fool-proofing structure 803 to a center of the reflecting surface is achieved, for example, in a case that the reflecting surface of the reflector plate 008 faces the display substrate 001 upwards, the first fool-proofing structure 803 is located on a lower right corner of the center of the reflecting surface. Optionally, a shape of the first fool-proofing structure 803 is not limited to a right-angle triangular pyramid shown in FIG. 12, and may further be random, which is not limited here.

In some embodiments, as shown in FIG. 5, FIG. 10, FIG. 11 and FIG. 13, further includes a light guide plate 010 located on a side of the reflector plate 008 facing the display substrate 001 in the containing space H, and an orthographic projection of the light guide plate 010 on the display substrate 001 roughly coincides with the orthographic projection of the reflector plate body 801 on the display substrate 001, that is, the orthographic projections of them just coincide with each other or are within an error range caused by factors such as manufacturing and measuring; and the light beads 501 are located on a side of the light guide plate 010 oriented towards the binding region BD, and an interval between the luminous surfaces of the light beads 501 and the light guide plate 010 is less than or equal to 0.1 mm, so as to be beneficial to uniform mixing of the emergent ray of the light beads 501 through the light guide plate 010.

Figure 13:
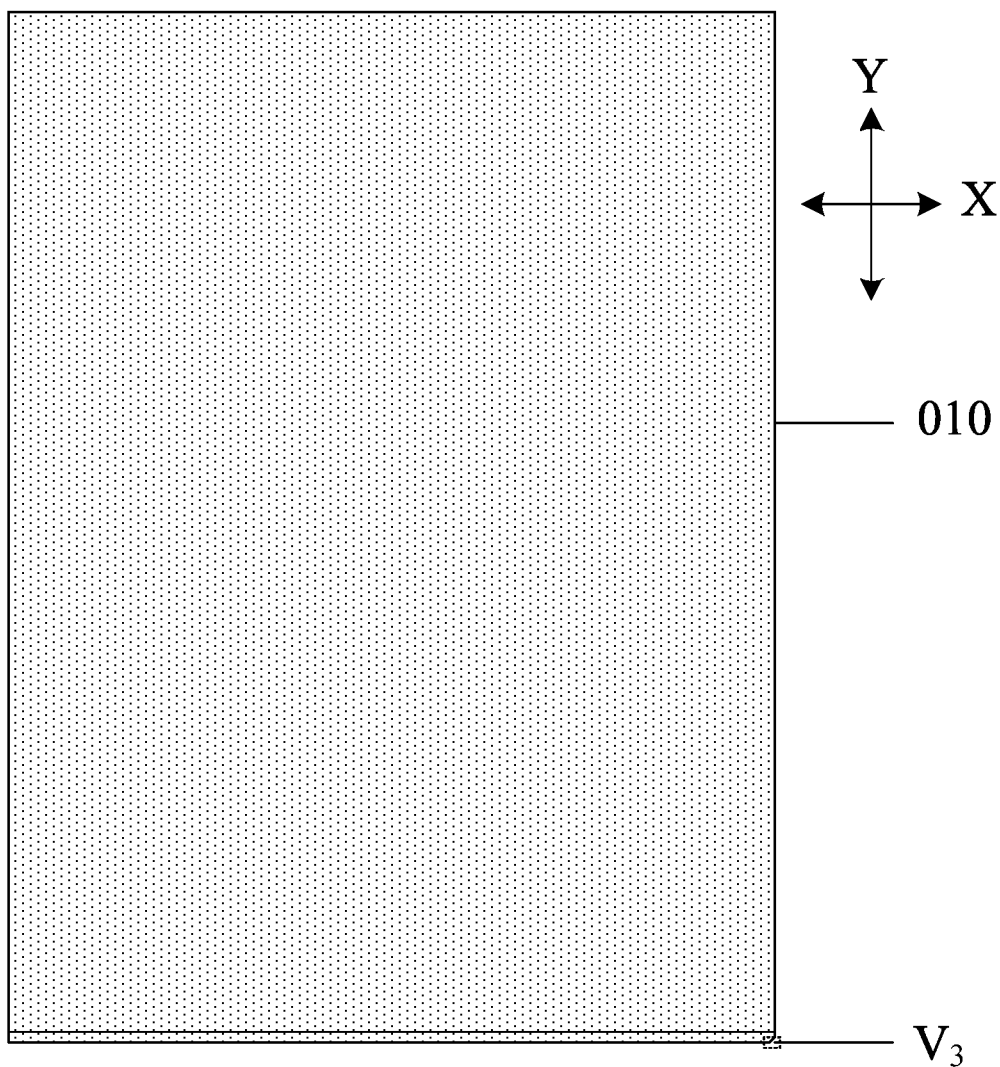
FIG. 13 is a schematic structural diagram of a light guide plate provided by an embodiment of the present disclosure.
Figure 14:
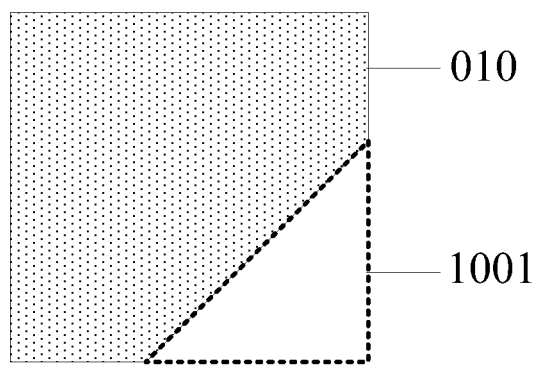
FIG. 14 is an enlarged schematic structural diagram of a region $V_3$ in FIG. 13.

In some embodiments, as shown in FIG. 13 and FIG. 14, the light guide plate 010 includes a light emitting surface, the light emitting surface needs to be oriented towards the display substrate 001, to be beneficial to accurate distinguishing of the light emitting surface in the arrangement process, a second fool-proofing structure 1001 may be arranged on the light guide plate 010, and it is ensured that a relative position of the second fool-proofing structure 1001 to a center of the light emitting surface is fixed. Optionally, in a case that the light emitting surface of the light guide plate 010 faces the display substrate 001 upwards, the second fool-proofing structure 1001 is located on a lower right corner of the center of the light emitting surface. Optionally, a shape of the second fool-proofing structure 1001 is not limited to a right-angle triangular pyramid shown in FIG. 14, and may further be random, which is not limited here.

Figure 15:
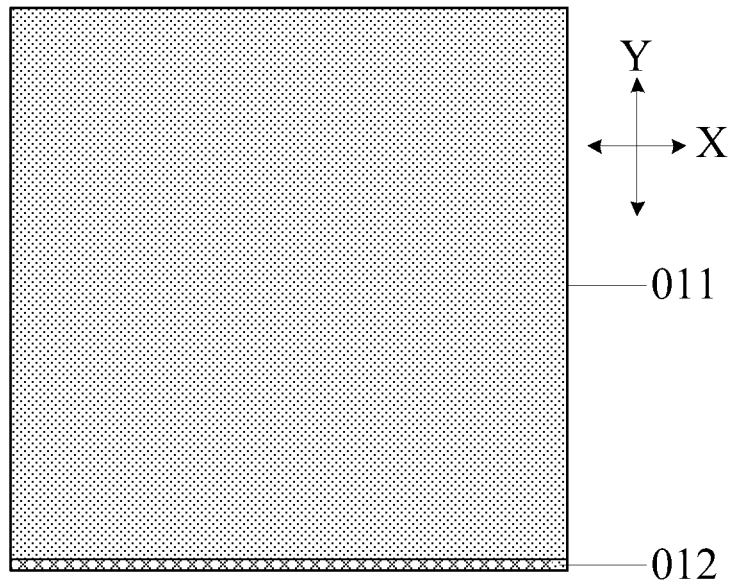
FIG. 15 is a schematic structural diagram of a diffuser and black adhesive provided by an embodiment of the present disclosure.

In some embodiments, as shown in FIG. 5, FIG. 10 and FIG. 15, may further include a diffuser 011 and black adhesive 012 located in the containing space H, the diffuser 011 is located on a side of the light guide plate 010 away from the reflector plate 008, the black adhesive 012 is located on a side of the diffuser 011 away from the light guide plate 010, and an orthographic projection of the black adhesive 012 on the display substrate 001 is on a side where the binding region BD is, of the border region BB, so as to avoid hotspot.

Figure 16:
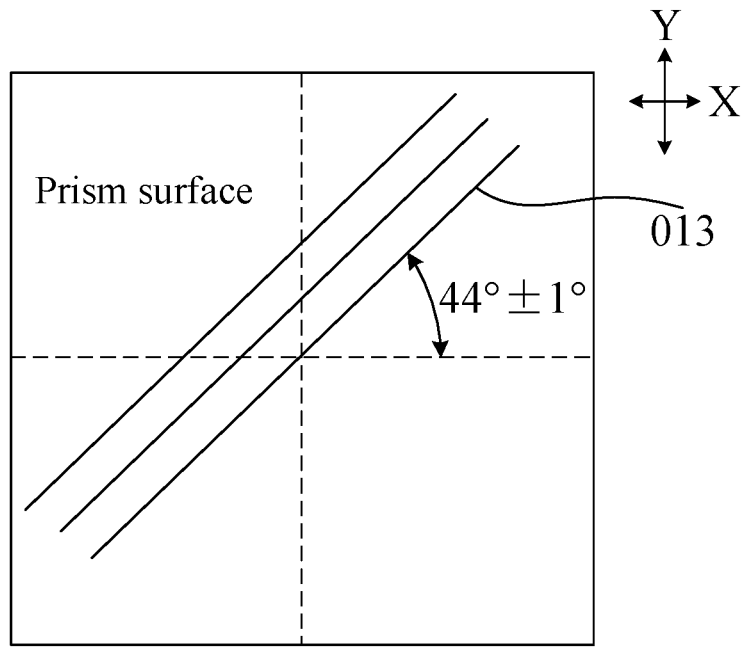
FIG. 16 is a schematic structural diagram of a prism provided by an embodiment of the present disclosure.

In some embodiments, as shown in FIG. 5, FIG. 10, and FIG. 16, further includes a prism 013 located on a side of the diffuser 011 away from the light guide plate 010, in order to ensure that a product is free of moire patterns, an included angle between an extension direction of the prism 013 and the first direction X may be set to be roughly equal to arctan $[(a\pm\sqrt{\Delta_1^2+\Delta_2^2+\Delta_3^2+\Delta_4^2})/b]$, that is, the included angle between the extension direction of the prism 013 and the first direction X is equal to arctan $[(a\pm\sqrt{\Delta_1^2+\Delta_2^2+\Delta_3^2+\Delta_4^2})/b]$, or a difference between the included angle between the extension direction of the prism 013 and the first direction X and arctan $[(a\pm\sqrt{\Delta_1^2+\Delta_2^2+\Delta_3^2+\Delta_4^2})/b]$ is within the error range caused by the factors such as manufacturing and measuring. Exemplarily, arctan $[(a\pm\sqrt{\Delta_1^2+\Delta_2^2+\Delta_3^2+\Delta_4^2})/b]$ is equal to 44°, and the included angle between the extension direction of the prism 013 and the first direction X is greater than or equal to 43° and less than or equal to 45°.

Figure 17:
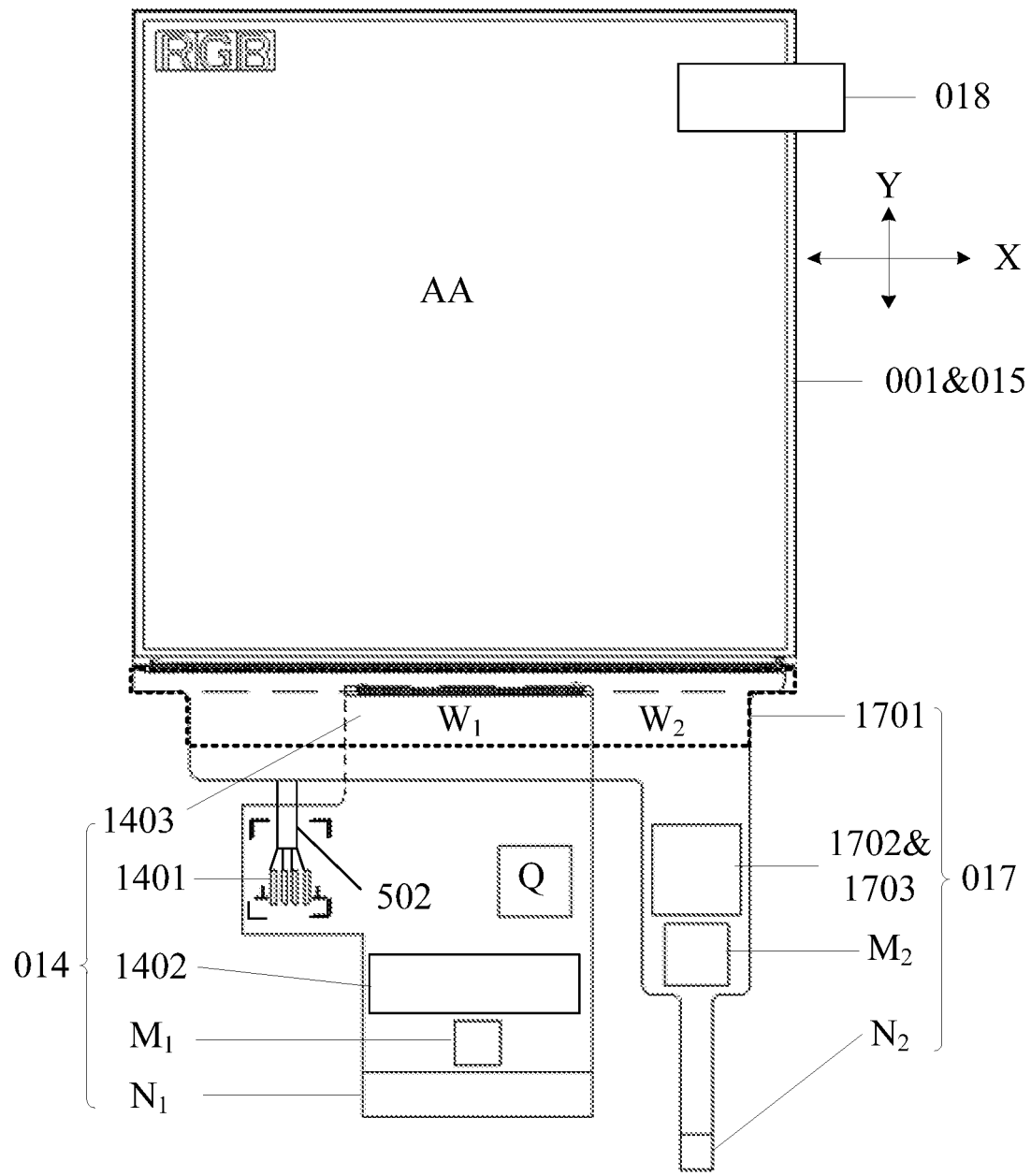
FIG. 17 is yet another schematic structural diagram of a display device provided by an embodiment of the present disclosure.

In some embodiments, as shown in FIG. 17, may further include a main flexible circuit board 014, the main flexible circuit board 014 includes a luminous control bonding pad 1401, the backlight flexible circuit board 502 is electrically connected with the luminous control bonding pad 1401, and a signal for controlling luminous intensity of the light beads 501 is provided through the main flexible circuit board 014.

In some embodiments, as shown in FIG. 17, the main flexible circuit board 014 may further include a display chip 1402, for facilitating manufacturing, the display chip 1402 may be located on the same side as the luminous control bonding pad 1401 on the main flexible circuit board 014, and the display substrate 001 is electrically connected with the display chip 1402. Accordingly, the main flexible circuit board 014 may further provide a drive signal for controlling liquid crystals to deflect for the display substrate 001.

In some embodiments, as shown in FIG. 17, the main flexible circuit board 014 may further include a first adsorption region $M_1$, and the first adsorption region $M_1$ is configured to flatten the main flexible circuit board 014 in a process of binding the main flexible circuit board 014 with the display substrate 001 and the backlight flexible circuit board 502, so as to be beneficial to smooth performing of a binding process. Optionally, to enhance an adsorption effect in the binding process, it is forbidden to arrange components in the first adsorption region $M_1$.

In some embodiments, as shown in FIG. 17, the main flexible circuit board 014 may further include a two-dimensional code Q, the two-dimensional code Q is located on an opposite side (such as a reverse side) of a side (such as a front side) where the luminous control bonding pad is located, and the two-dimensional code contains material number information, a production date, etc., so as to facilitate binding of the main flexible circuit board 014 with a product type of the display panel (including the display substrate 001 and the opposite substrate 002 oppositely arranged).

In some embodiments, as shown in FIG. 17, the main flexible circuit board 014 may further include a first bending region $W_1$ and a first flexible protection film 1403, the first flexible protection film 1403 covers the first bending region $W_1$, so as to be beneficial to bending of the main flexible circuit board 014 towards a side of the display substrate 001 facing away from the opposite substrate 002, so that narrow framing of the product is ensured. Exemplarily, the first bending region $W_1$ is full of green oil to form the first flexible protection film 1403.

Figure 18:
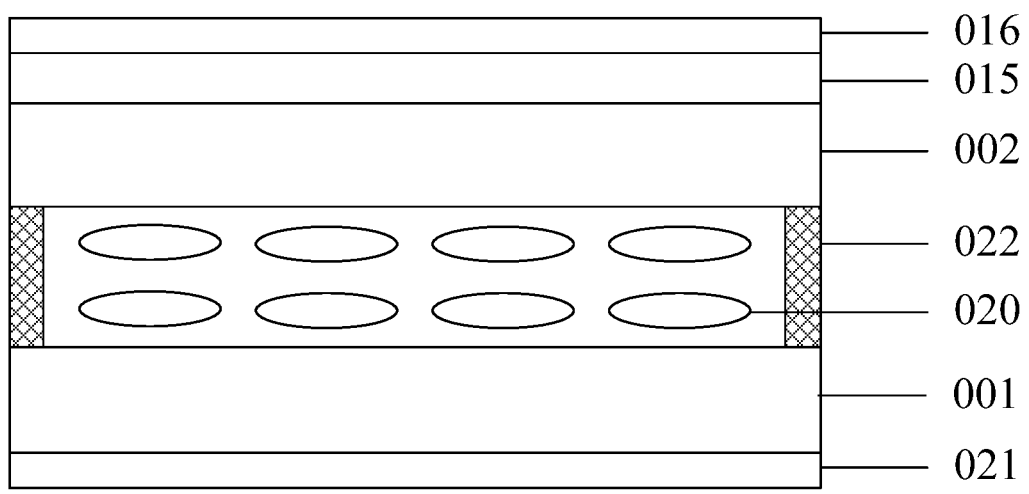
FIG. 18 is yet another schematic structural diagram of a display device provided by an embodiment of the present disclosure.
Figure 19:
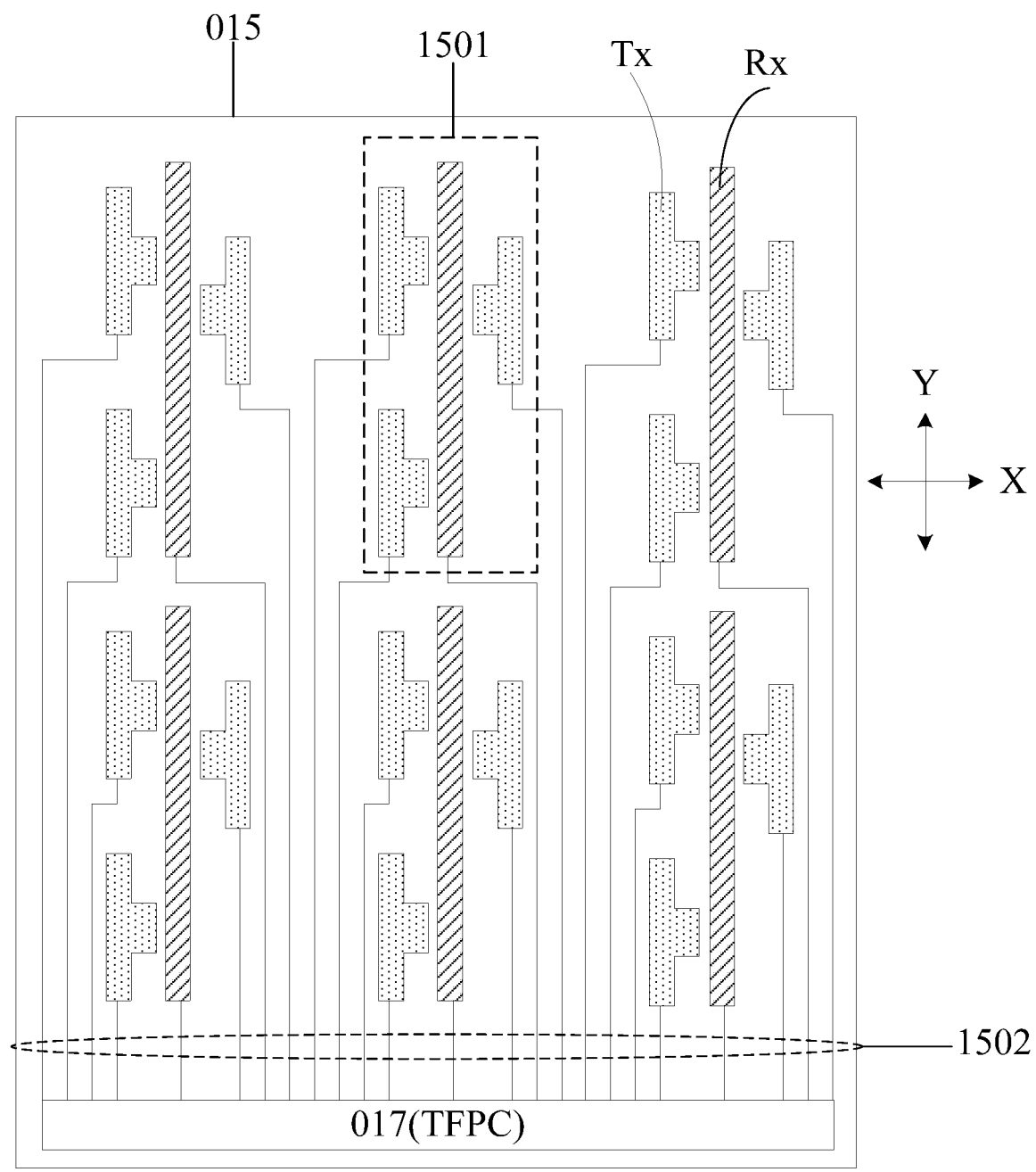
FIG. 19 is a schematic structural diagram of a touch panel provided by an embodiment of the present disclosure.
Figure 20:
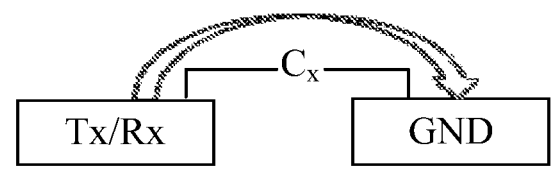
FIG. 20 is a self-mutual-capacitance principle schematic diagram when touch does not occur provided by an embodiment of the present disclosure.
Figure 21:
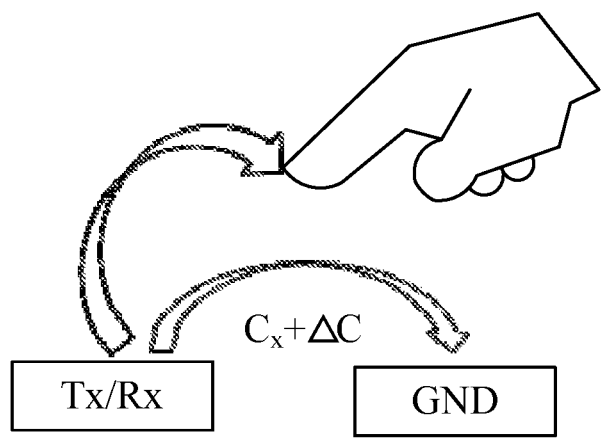
FIG. 21 is a self-mutual-capacitance principle schematic diagram when touch occurs provided by an embodiment of the present disclosure.
Figure 22:
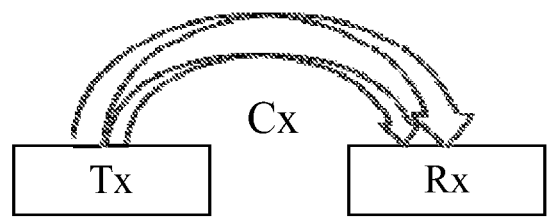
FIG. 22 is another self-mutual-capacitance principle schematic diagram when touch does not occur provided by an embodiment of the present disclosure.
Figure 23:
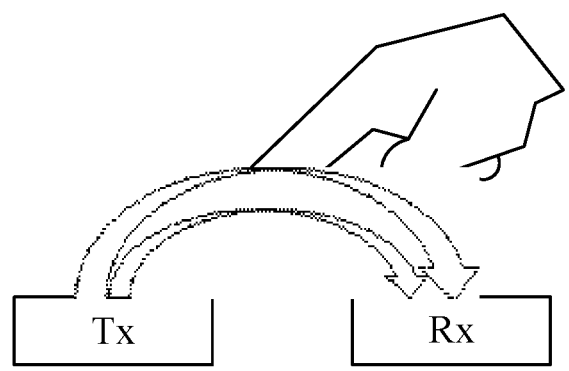
FIG. 23 is yet another self-mutual-capacitance principle schematic diagram when touch occurs provided by an embodiment of the present disclosure.

In some embodiments, as shown in FIG. 18 and FIG. 19, may further include a touch panel 015 located on the side of the opposite substrate 002 away from the display substrate 001, for example, the touch panel 015 is located between the opposite substrate 002 and a first polaroid 016, the touch panel 015 includes a plurality of touch electrode sets 1501, each touch electrode set 1501 includes a touch sensing electrode Rx and at least one touch drive electrode Tx which are arranged on the same layer, optionally, the touch drive electrodes Tx may be distributed on two sides of the touch sensing electrodes Rx in an extension direction, for example, the touch sensing electrodes Rx extend in the second direction Y, and the touch drive electrodes Tx are located on two side-by-side sides of the touch sensing electrodes Rx in the first direction X. Optionally, the touch sensing electrodes Rx are strip-shaped electrodes, and the touch drive electrodes Tx are electrodes with protruding portions, so as to increase a relative area of the touch drive electrodes Tx to the touch sensing electrodes Rx, so that a mutual capacitance between them is increased, and touch sensitivity is improved.

In order to prevent the touch drive electrodes Tx and the touch sensing electrodes Rx from shielding display light, a transparent conducting material (such as, indium tin oxide ITO), etc. may be adopted to manufacture the touch drive electrodes Tx and the touch sensing electrodes Rx. Moreover, touch is achieved based on a self-mutual capacitance touch principle in the present disclosure. Specifically, the self-mutual capacitance touch principle is shown in FIG. 20 to FIG. 24, when fingers touch the touch drive electrodes Tx or the touch sensing electrodes Rx, a capacitance of a ground (GND) is increased equivalently, a capacitance detected on a touch point is increased, a touch flexible circuit board 017 will detect a variable quantity of the capacitance and feed it back to a system end, and therefore whether touch happens may be judged; and when the fingers touch a region between the touch drive electrodes Tx and the touch sensing electrodes Rx, the fingers shield part of an electric field on the touch point, resulting in reduction of the capacitance detected on the touch point, and the touch flexible circuit board 017 detects the variable amount of the capacitance and feeds it back to the system end, so as to be able to judge whether touch happens. A touch resolution ratio of the touch panel 015 of the self-mutual capacitance principle is high, a product is light and thin, material cost is low, transmittance is high, and optical performance is good.

Figure 24:
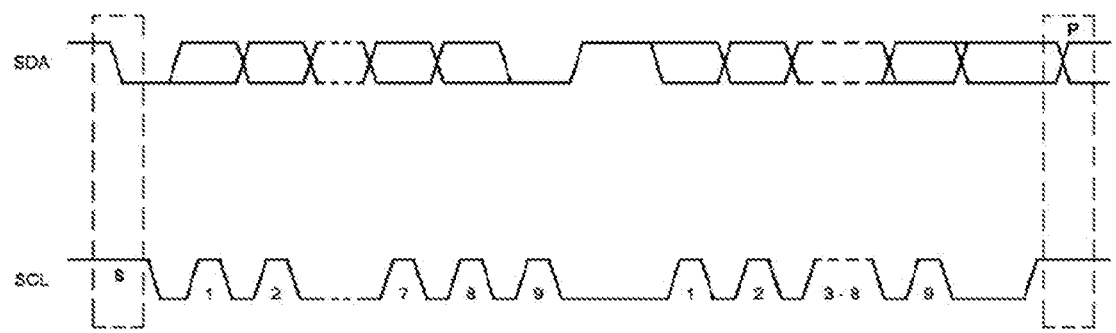
FIG. 24 is a touch time sequence diagram provided by an embodiment of the present disclosure.

FIG. 24 is a touch time sequence diagram, and a clock (SCL) pin and a data (SDA) pin communicate with a main central processing unit (CPU). In a communication process, the touch flexible circuit board 017 serves as a slave device always, and used communication is initiated by the main CPU. When SCL remains at a high level, and an SDA jumps from the high level to a low level, it is a start (S) mark, and address information and data information are both transmitted after the S mark. After communication is finished, the main CPU sends a stop (P) signal, and at the moment, the SCL remains at the high level, and the SDA jumps from the low level to the high level.

A central control system of white goods in the related art needs to adopt manual key operation, the touch panel 015 between the opposite substrate 002 and the first polaroid 016 is adopted in the present disclosure to achieve touch operation, and when the display device is a device such as the white goods, not only can it ensure better touch performance, but also it is thin and light and has good transmittance, thereby remarkably improving user experience.

In some embodiments, as shown in FIG. 17, the touch flexible circuit board 017 includes a second adsorption region $M_2$, the second adsorption region $M_2$ is configured to flatten the touch flexible circuit board 017 in a process of binding the touch flexible circuit board 017 with the touch panel 015, so as to be beneficial to smooth operation of the binding process. Optionally, to enhance the adsorption effect in the binding process, it is forbidden to arrange components in the second adsorption region $M_2$.

In some embodiments, as shown in FIG. 17, the touch flexible circuit board 017 may further include a second bending region $W_2$ and a second flexible protection film 1701, and the second flexible protection film 1701 covers the second bending region $W_2$, so as to be beneficial to bending of the touch flexible circuit board 017 towards the side of the display substrate 001 facing away from the opposite substrate 002, so that narrow framing of the product is ensured. Exemplarily, the second bending region $W_2$ is full of green oil to form the second flexible protection film 1701. Optionally, an orthographic projection of the first bending region $W_1$ on the touch flexible circuit board 017 is located in the second bending region.

In some embodiments, as shown in FIG. 17, the touch flexible circuit board 017 further includes a touch chip 1702 and a stiffening plate 1703, the stiffening plate 1703 is located on a side of the touch flexible circuit board 1702, a side (such as, a reverse side) where the stiffening plate 1703 is located is opposite to a side (such as, a front side) where the touch chip 1702 is located, and a region where the stiffening plate 1703 is located roughly coincides with a region where the touch chip 1702 is located, that is, both of them just coincide with each other or are within the error range caused by factors such as manufacturing and measuring, and therefore the stiffening plate 1703 plays a good role in supporting the touch chip 1702, and binding of the touch chip 1702 and a touch line 1502 is facilitated.

In some embodiments, as shown in FIG. 17, the main flexible circuit board 014 may further include a first pin region $N_1$ electrically connected with the main CPU, and the touch flexible circuit board 017 may further include a second pin region $N_2$ electrically connected with the main CPU.

Figure 25:
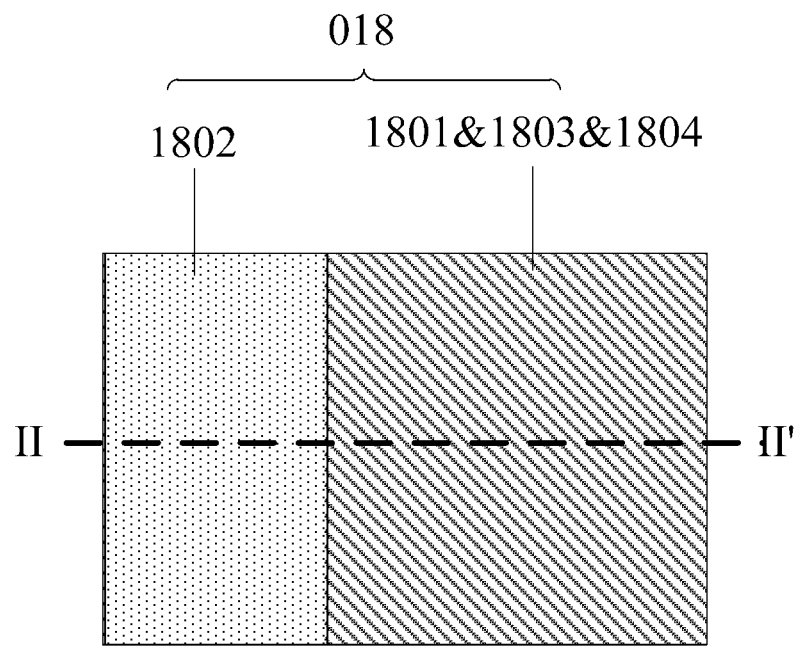
FIG. 25 is a schematic structural diagram of pull tape provided by an embodiment of the present disclosure.
Figure 26:
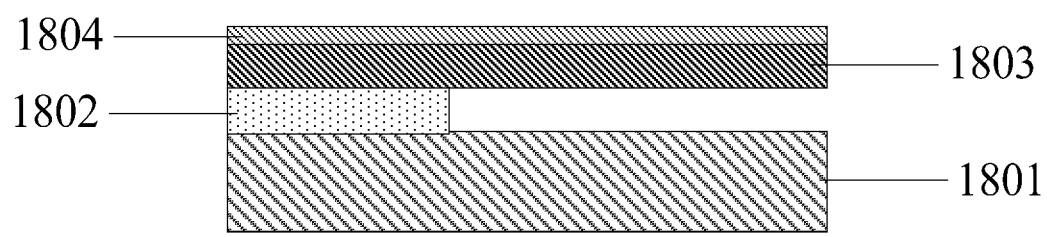
FIG. 26 is a cross-section schematic structural diagram along a line II-II' in FIG. 25.

In some embodiments, as shown in FIG. 17, a pull tape 018 may further be arranged on an upper right corner of a surface of a side of the first polaroid 016 away from the touch panel 015, and part of the pull tape 018 extends relative to the first polaroid 016. Optionally, as shown in FIG. 25 and FIG. 26, the pull tape 018 may include a release film 1801, a base 1802, adhesive tape 1803 and a protection film 1804 which are arranged in a stacked manner, wherein sizes of the release film 1801, the adhesive tape 1803 and the protection film 1804 are the same, and the base 1802 only covers an edge of the adhesive tape 1803. In specific implementation, the release film 1801 may be torn off from the base 1802 firstly, and then. the adhesive tape 1803 not covered by the base 1802 is pasted on the first polaroid 016, so that the base 1802 extends relative to the first polaroid 016. When the protection film of the first polaroid 016 needs to be removed, the release film 1801 in a region where the base 1802 is located is pulled, so that the protection film is driven to be separated from the first polaroid 016 while the pull tape 018 is torn off.

In some embodiments, a bar code (MDL) may further be arranged on a side (namely, a reverse side) of a back plate 009 away from the reflector plate 008, so as to facilitate tracing of information such as a producing area and a type of the display device through the bar code.

In some embodiments, as shown in FIG. 5 and FIG. 18, may further include a liquid crystal layer 020 located between the display substrate 001 and the opposite substrate 002, a second polaroid 021 located on a side of the display substrate 001 away from the opposite substrate 002, a sealant 022 sealing the liquid crystal layer 020 between the display substrate 001 and the opposite substrate 002, etc. The display substrate 001 may further include a first substrate 102, a gate insulation layer 103, an interlayer dielectric layer 104, etc., and the opposite substrate 002 may further include a flat layer 203, a second substrate 204, etc. Other essential components of the display device should be understood and possessed by those ordinarily skilled in the art, which is neither repeated here, nor shall serve as a limitation to the present disclosure.

Correspondingly, an embodiment of the present disclosure provides an assembly method of a display device, and the assembly method may include following steps:
  firstly, a touch panel 015 is fixed to a light emitting side of a display panel, and the display panel includes a display substrate 001 and an opposite substrate 002 which are oppositely arranged;
  secondly, binding connection is performed on a main flexible circuit board 014 and the display substrate 001, binding connection is performed on a touch flexible circuit board 017 and the touch panel 015, a light guide module and a light bar 005 are fixed, and the light guide module includes an adhesive frame 007, a reflector plate 008, a light guide plate 010, a diffuser 011 and a prism 012;
  thirdly, a center point of the display panel and a center point of the light guide module are obtained, and the center point of the display panel is controlled to coincide with the center point of the light guide module, so as to achieve alignment of the display panel and the light guide module;
  fourthly, welding fixing is performed on a backlight flexible circuit board 502 of the light bar 005 and the main flexible circuit board 014;
  fifthly, bonding pad adhesive tape is attached to the main flexible circuit board 014, the bonding pad adhesive tape at least covers a region where a luminous control bonding pad 1401 of the main flexible circuit board 014 is located and a region where a display chip 1402 is located; and
  sixthly, pull tape 018 is attached to a side of the display panel away from the touch panel 015.

In the above assembly method, assembly of the light strip 005 and the light guide plate 010 in the light guide module is manual assembly, remaining steps may all achieve mechanical automatic assembly, and high assembly precision, accurate positioning, uniform product stress, product yield improvement, and market competitiveness enhancement are ensured. Moreover, the assembly method of the present disclosure is adopted to be able to control that an alignment fit tolerance of the display region AA and shading adhesive 004 is within 0.15 mm, which may effectively prevent the shading adhesive 004 from shielding a pixel.

In some embodiments, the above display device provided by the embodiment of the present disclosure may be a mobile phone, a tablet personnel computer, a television, a display, a notebook computer, a digital photo frame, a navigator, an intelligent watch, a fitness bracelet, a personnel digital assistant and any product or component with a display function. The display device includes but is not limited to a radio frequency unit, a network module, an audio output & input unit, a sensor, a display unit, a user input unit, an interface unit, a memory, a processor, a power source and other components. In addition, those skilled in the art may understand that the above structure does not constitute a limitation to the above display device provided by the embodiment of the present disclosure, in other words, the above display device provided by the embodiment of the present disclosure may include more or less components, or combine some components, or arrange different components.

Apparently, those skilled in the art may make various modifications and variations to embodiments of the present disclosure without departing from the spirit or scope of the present disclosure. In this way, if these modifications and variations of the present disclosure fall within the scope of the claims of the present disclosure and their equivalent art, the present disclosure also intends to include these modifications and variations.

What is claimed is:

1. A display device, comprising:
  a display substrate, wherein the display substrate comprises a display region and a border region on a periphery of the display region, at least part of the border region serves as a binding region, and the display substrate comprises a grounding terminal in the binding region;
  an opposite substrate arranged opposite to the display substrate, wherein an orthographic projection of the opposite substrate on the display substrate exposes the binding region, the opposite substrate comprises a black matrix arranged on a side facing the display substrate and an electrostatic shielding layer arranged on a side facing away from the display substrate, the black matrix comprises a first opening, an orthographic projection of the first opening on the display substrate is on a side where the binding region is, of the border region, the first opening breaks the black matrix in a first direction, and the first direction intersects with a direction pointing to the binding region from the display region; and
  conducting adhesive connecting the grounding terminal and the electrostatic shielding layer, wherein an orthographic projection of the conducting adhesive on the display substrate is on the side where the binding region is, of the border region, and the conducting adhesive is contact with a side face of the black matrix oriented towards the binding region and perpendicular to the display substrate.

2. The display device according to claim 1, further comprising: a shading adhesive on a side away from the opposite substrate, of the display substrate and a light bar on a side away from the display substrate, of the shading adhesive, wherein an orthographic projection of the shading adhesive on the display substrate surrounds the display region, and an orthographic projection of the light bar on the display substrate is on the side where the binding region is, of the border region; and
  a minimum preset distance between the orthographic projection of the first opening on the display substrate and the orthographic projection of the shading adhesive on the display substrate is a, a manufacturing tolerance of the shading adhesive is $\Delta_1$, an assembly tolerance of the shading adhesive is $\Delta_2$, a manufacturing tolerance of the first opening is $\Delta_3$, an assembly tolerance of the display substrate and the opposite substrate is $\Delta_4$, in a direction perpendicular to the display substrate, a maximum distance between a surface of the shading adhesive facing the display substrate and a surface of the display substrate facing the opposite substrate is b, a critical angle at which an emergent ray of the light bar is fully reflected on the surface of the display substrate facing the opposite substrate is θ, and (a± $\sqrt{\Delta_1^2+\Delta_2^2+\Delta_3^2+\Delta_4^2}$)/b≥tan θ.

3. The display device according to claim 2, wherein the first opening comprises a first sub-opening at a certain position away from the conducting adhesive, a shape of the first sub-opening is an arc, and a radian of the first sub-opening is greater than or equal to 90° and less than or equal to 94°.

4. The display device according to claim 3, wherein the first opening further comprises a second sub-opening and a third sub-opening which extend in the first direction, and the first sub-opening communicates the second sub-opening with the third sub-opening; and in a second direction, a distance between an orthographic projection of the second sub-opening on the display substrate and the display region is greater than a distance between an orthographic projection of the third sub-opening on the display substrate and the display region, and the second direction is a direction pointing to the binding region from the display region.

5. The display device according to claim 4, wherein the black matrix further comprises a second opening, and an orthographic projection of the second opening on the display substrate surrounds the display region;
wherein the orthographic projection of the second opening on the display substrate is in the orthographic projection of the shading adhesive on the display substrate.

6. The display device according to claim 5, wherein an included angle between a first shortest line and the first direction is α, the first shortest line is between the orthographic projection of the shading adhesive on the display substrate and the orthographic projection of the third sub-opening on the display substrate, an included angle between a second shortest line and the first direction is β, the second shortest line is between the orthographic projection of the second opening on the display substrate and the orthographic projection of the third sub-opening on the display substrate, and α>β.

7. The display device according to claim 6, wherein α=arctan (n/m), β=arctan (f/e), m is a distance between the orthographic projection of the shading adhesive on the display substrate and the orthographic projection of the third sub-opening on the display substrate in the first direction, n is a distance between the orthographic projection of the shading adhesive on the display substrate and the orthographic projection of the third sub-opening on the display substrate in the second direction, e is a distance between the orthographic projection of the second opening on the display substrate and the orthographic projection of the third sub-opening on the display substrate in the first direction, and f is a distance between the orthographic projection of the second opening on the display substrate and the orthographic projection of the third sub-opening on the display substrate in the second direction.

8. The display device according to claim 5, wherein a width of the first opening is identical to a width of the second opening.

9. The display device according to claim 5, wherein a boundary extension line of a side of the second opening away from the display region in the second direction is on a side of the second sub-opening oriented towards the first sub-opening, and a distance between the boundary extension line of the side of the second opening away from the display region in the second direction and an end face of the first sub-opening adjacent to the second sub-opening is less than or equal to 52 μm.

10. The display device according to claim 2, further comprising a supporting structure between the shading adhesive and the display substrate, wherein an orthographic projection of the supporting structure on the display substrate is in the orthographic projection of the shading adhesive on the display substrate;
the display device further comprising an adhesive frame, wherein the adhesive frame comprises an adhesive frame body and a plurality of first protrusions, the adhesive frame body defines a containing space, an orthographic projection of the containing space on the display substrate is greater than the display region and partially overlaps the border region, orthographic projections of the plurality of first protrusions on the display substrate are on the side where the binding region is, of the border region, the plurality of first protrusions extend towards the containing space, and the plurality of first protrusions are arranged side by side in the first direction; and
the light bar comprises a plurality of light beads sequentially arranged in the first direction, and the light beads are arranged in grooves between the first protrusions.

11. The display device according to claim 10, wherein the plurality of first protrusions comprise a plurality of first sub-protrusions and a plurality of second sub-protrusions, and the first sub-protrusions and the second sub-protrusions are alternately arranged in the first direction; and
a size of each of the light beads in the second direction are greater than a size of each of the second sub-protrusions in the second direction and less than a size of each of the first sub-protrusions in the second direction, and the second direction is the direction pointing to the binding region from the display region.

12. The display device according to claim 11, wherein a ratio of the size of each of the first sub-protrusions in the second direction to the size of each of the second sub-protrusions in the second direction is greater than 1 and less than or equal to 2.

13. The display device according to claim 11, wherein a distance between luminous surfaces of the light beads and the display region in the second direction is g, an interval between the first sub-protrusions and the second sub-protrusions in the first direction is h, g/h>0.7.

14. The display device according to claim 10, further comprising a reflector plate in the containing space, wherein the reflector plate comprises a reflector plate body and a plurality of second protrusions on a side close to the light beads, of the reflector plate body; and
the orthographic projections of the light beads on the display substrate are in orthographic projections of the second protrusions on the display substrate, and the first protrusions are arranged in grooves between the second protrusions.

15. The display device according to claim 14, wherein a gap exists between a surface away the display substrate, of the light beads and a surface facing the display substrate, of the reflector plate.

16. The display device according to claim 14, wherein the reflector plate comprises a reflecting surface and a first fool-proofing structure, the reflecting surface is oriented towards the display substrate, and a relative position of the first fool-proofing structure to a center of the reflecting surface is fixed.

17. The display device according to claim 14, further comprising a light guide plate on the side of facing the display substrate, the reflector plate in the containing space, and an orthographic projection of the light guide plate on the display substrate approximately coincides with an orthographic projection of the reflector plate body on the display substrate; and
the light beads are on a side oriented towards the binding region, of the light guide plate, and an interval between the luminous surfaces of the light beads and the light guide plate is less than or equal to 0.1 mm.

18. The display device according to claim 17, wherein the light guide plate comprises a light emitting surface and a second fool-proofing structure, the light emitting surface is oriented towards the display substrate, and a relative position of the second fool-proofing structure to a center of the light emitting surface is fixed.

19. The display device according to claim 2, wherein the light bar further comprises a backlight flexible circuit board, and the backlight flexible circuit board is electrically connected with the plurality of light beads; and
the display device further comprises a main flexible circuit board, the main flexible circuit board comprises a first adsorption region, and the first adsorption region is configured to flatten the main flexible circuit board in a process of binding the main flexible circuit board with the display substrate and the backlight flexible circuit board.

20. The display device according to claim 1, further comprising a touch panel on a side away from the display substrate, of the opposite substrate and a touch flexible circuit board electrically connected with the touch panel, the touch flexible circuit board comprises a second adsorption region, and the second adsorption region is configured to flatten the touch flexible circuit board in a process of binding the touch flexible circuit board with the touch panel;
wherein the touch flexible circuit board further comprises a touch chip and a stiffening plate, the stiffening plate is on a side of the touch flexible circuit board; a side where the stiffening plate is located, is opposite to a side where the touch chip is located, and a region where the stiffening plate is located coincides with a region where the touch chip is located.

\* \* \* \* \*